(12) United States Patent
Suzuki

(10) Patent No.: US 7,490,136 B2
(45) Date of Patent: Feb. 10, 2009

(54) DIGITAL CONTENTS DISTRIBUTING SYSTEM AND DISTRIBUTING METHOD

(75) Inventor: Akira Suzuki, Tokyo (JP)

(73) Assignee: Ricoh Company, Ltd., Tokyo (JP)

( * ) Notice: Subject to any disclaimer, the term of this patent is extended or adjusted under 35 U.S.C. 154(b) by 912 days.

(21) Appl. No.: 10/736,905

(22) Filed: Dec. 17, 2003

(65) Prior Publication Data

US 2004/0153528 A1    Aug. 5, 2004

(30) Foreign Application Priority Data

| Dec. 17, 2002 | (JP) | ............................. 2002-365685 |
| Dec. 24, 2002 | (JP) | ............................. 2002-372803 |
| Dec. 24, 2002 | (JP) | ............................. 2002-372804 |
| Mar. 31, 2003 | (JP) | ............................. 2003-096497 |
| Mar. 31, 2003 | (JP) | ............................. 2003-096498 |
| Mar. 31, 2003 | (JP) | ............................. 2003-096499 |

(51) Int. Cl.
*G06F 15/16* (2006.01)
*G06Q 30/00* (2006.01)
*H04K 1/00* (2006.01)

(52) U.S. Cl. ........................ 709/217; 709/203; 705/26; 705/51

(58) Field of Classification Search ....................... None
See application file for complete search history.

(56) References Cited

U.S. PATENT DOCUMENTS

| 6,751,598 | B1 * | 6/2004 | Yagawa et al. ................. 705/51 |
| 7,127,429 | B2 * | 10/2006 | Kang ........................... 705/54 |
| 2002/0029200 | A1 * | 3/2002 | Dulin et al. .................... 705/67 |
| 2002/0049679 | A1 * | 4/2002 | Russell et al. ................. 705/52 |
| 2002/0087675 | A1 * | 7/2002 | Yoshii et al. ................. 709/223 |

FOREIGN PATENT DOCUMENTS

| JP | 2002-269386 | 9/2002 |
| JP | 2002-269461 | 9/2002 |

\* cited by examiner

*Primary Examiner*—Wen-Tai Lin
(74) *Attorney, Agent, or Firm*—Morrison & Foerster LLP

(57) ABSTRACT

A contents server, a plurality of user terminals, and contents holder terminal 4 as a copyright holder are mutually connected to one another via the Internet. A predetermined storage media is sold at a store. Control of login to the system and management of accounting are executed by inserting only the storage media to the user terminal. Each user terminal that downloaded the contents can distribute the downloaded contents secondarily.

21 Claims, 32 Drawing Sheets

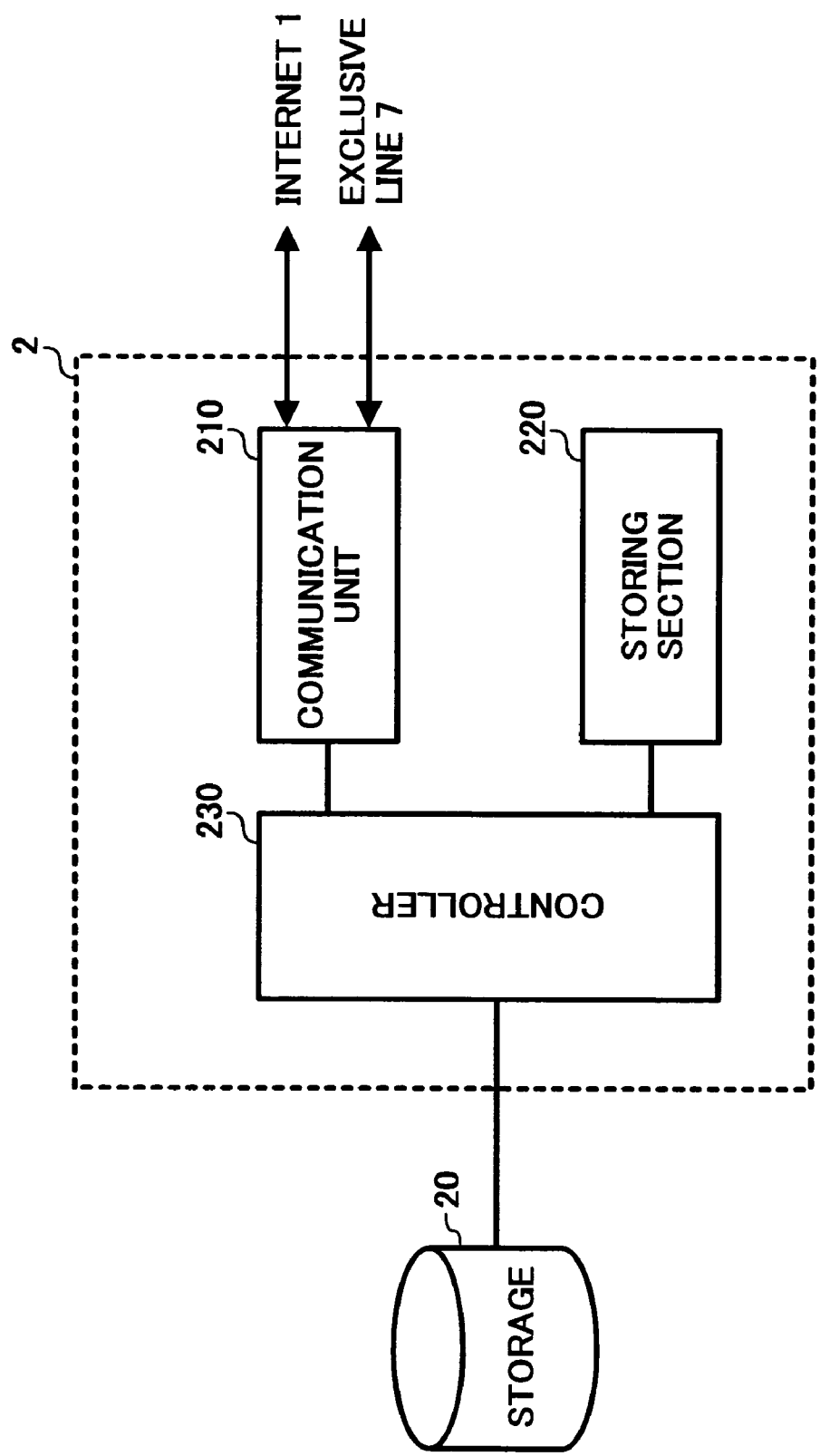

FIG.3A

| USER NAME | USER ID | PASSWORD | IP ADDRESS | HISTORICAL INFORMATION | HOLDING CONTENTS INFORMATION | POINT |
|---|---|---|---|---|---|---|

FIG.3B

| CONTENTS NAME | CONTENTS ID | SUMMARY, THUMBNAIL | WRITER INFORMATION | UNIT COST | DISTRIBUTABLE PERSON INFORMATION | HISTORICAL INFORMATION |
|---|---|---|---|---|---|---|

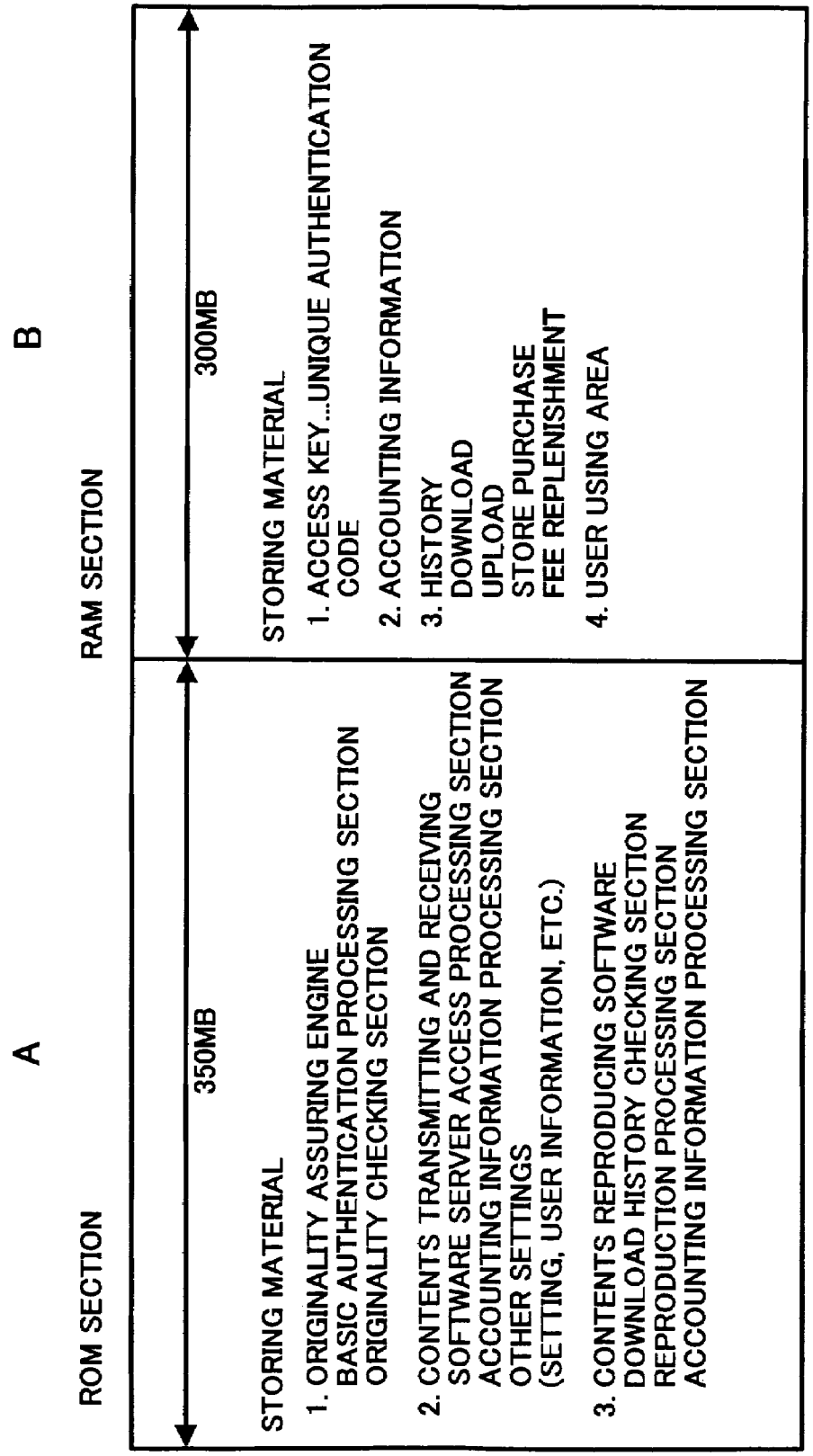

ACCOUNTING INFORMATION

FIG.12A

| EVENT ID | TIME AND DATE | AMOUNT | BALANCE | COMMUNICATION PARTNER | REASON |
|---|---|---|---|---|---|
| E325V3124 | 200212091805 | 2000 | 2000 | TK3265 | CH0100241 |
| D324V0159 | 200212100952 | -500 | 1500 | KB300213 | DL09EG012 |
| U5642K9012 | 200212101935 | 100 | 1600 | KX100241 | UL09MM020 |
| E333V5936 | 200212111946 | -1000 | 600 | TK3265 | PC10EY024 |
| | . | | | | |
| | . | | | | |

HISTORY

FIG.12B

| EVENT ID | TIME AND DATE | EVENT | COMMUNICATION PARTNER | ITEM | LINK |
|---|---|---|---|---|---|
| Z201F302J | 200212100952 | DL | FH202238 | 03MA004 | E325V3142 |
| Z201K002L | 200212101935 | UL | KB300213 | 06YK025 | D324V0159 |
| Z201K935M | 200212111946 | PC | TK3265 | 10EY024 | E333V5936 |
| E333V5936 | 200212111946 | CH | TK1862 | - | PC10024 |
| | . | | | | |
| | . | | | | |

FIG.17A

<LIVE BROADCASTING CONTENTS REGISTRATION TABLE>

| SPONSOR NAME | DATE | VENUE NAME | DISTRIBUTION PROVIDER | ... |
|---|---|---|---|---|
| ABC | yymmdd | S PUBLIC HALL | R PROVIDER | ... |
| XYZ | yymmdd | N HALL | M DISTRIBUTION CENTER | ... |
| : | : | : | : | : |

FIG.17B

<VENUE INFORMATION TABLE>

| VENUE NAME | CAPACITY | THE NUMBER OF CAMERAS | ACOUSTIC INFORMATION | ... |
|---|---|---|---|---|
| S PUBLIC HALL | 600 PERSONS | 10 CAMERAS | *** | ... |
| N HALL | 1500 PERSONS | 15 CAMERAS | *** | ... |
| : | : | : | : | : |

FIG.17C

<DISTRIBUTION INFORMATION TABLE>

| SERVER NAME | PERFORMANCE | LINK | SPEED | ... |
|---|---|---|---|---|
| AA COMPANY | *** | *** | *** | ... |
| BB COMPANY | *** | *** | *** | ... |
| : | : | : | : | : |

FIG.17D

<SPONSOR INFORMATION TABLE>

| SPONSOR NAME | PAST PERFORMANCE STATE | CONTENTS DL STATE | SEARCHING RESULT | ... | REMAINING DAY LEFT BEFORE OPENING |
|---|---|---|---|---|---|
| ABD | CAPACITY 100% | 100 TIMES/DAY | 12000 HITS | ... | 90 DAYS |
|  | CAPACITY 95% | 120 TIMES/DAY | 15000 HITS | ... | 30 DAYS |
| : | : | : | : | : | : |

| XXX LIVE APPLICATION |||
|---|---|---|
| USER INFORMATION |||
| ID | 1234567890 ||
| USER NAME | ○○ ICHIRO ||
| E-MAIL | xxxx.xxxx@xxxx.co.jp ||

|  |  |
|---|---|
|  | FROM START TO END APPLICATION AMOUNT ¥2,500– |
| VENUE: ○○ BUDOKAN | COMPETITIVE RATIO AS OF 11:00 APR. 1, 2003: 5.25 ANNOUNCEMENT DATE OF LOTTERY RESULT IS APR. 3 |
| VENUE: ×× ARENA | COMPETITIVE RATIO AS OF 11:00 APR. 1, 2003: 5.25 ANNOUNCEMENT DATE OF LOTTERY RESULT IS APR. 3 |

| DESIRABLE PURCHASE TICKET |||
|---|---|---|
| TIME SELECTION | VENUE SELECTION | CAMERA SELECTION |
| START ¥2,500–<br>0:30 ¥2,300–<br>1:00 ¥2,100–<br>1:30 ¥1,900– | ○○ BUDOKAN<br>×× ARENA | ENTIRETY<br>RANDOM<br>VOCAL<br>DRUM |

☑ ALLOWANCE OF REDISTRIBUTION (REFUND IS PRESENT *1)
☑ AUTOMATIC RECONNECTION *2

*1 AMOUNT OF MONEY IS DECIDED BY REDISTRIBUTION NUMBER.
*2 RECONNECTION IS AUTOMATICALLY MADE WHEN RECOVERY FROM DISCONNECTION DUE TO COMMUNICATION TROUBLE IS ACHIEVED.

| APPLICATION |

FIG. 18B

| PURCHASE INFORMATION ||
|---|---|
| 30 MINUTES DELAY FROM START APPLICATION AMOUNT ¥2,300- | 1 HOUR DELAY FROM START APPLICATION AMOUNT ¥2,100- |
| COMPETITIVE RATIO AS OF 11:00 APR. 1, 2003: 0.9 NO LOTTERY | COMPETITIVE RATIO AS OF 11:00 APR. 1, 2003: 0.5 NO LOTTERY |
| COMPETITIVE RATIO AS OF 11:00 APR. 1, 2003: 0.9 NO LOTTERY | COMPETITIVE RATIO AS OF 11:00 APR. 1, 2003: 0.5 NO LOTTERY |

FIG. 18C

| 1 HOUR AND HALF DELAY FROM START APPLICATION AMOUNT ¥1,900- | AFTER END APPLICATION AMOUNT ¥1,900- |
|---|---|
| COMPETITIVE RATIO AS OF 11:00 APR. 1, 2003: 0.3 NO LOTTERY | COMPETITIVE RATIO AS OF 11:00 APR. 1, 2003: 0.3 NO LOTTERY |
| COMPETITIVE RATIO AS OF 11:00 APR. 1, 2003: 0.3 NO LOTTERY | COMPETITIVE RATIO AS OF 11:00 APR. 1, 2003: 0.3 NO LOTTERY |

| XXX LIVE APPLICATION |||
|---|---|---|
| USER INFORMATION |||
| ID | 1234567890 ||
| USER NAME | ○○ ICHIRO ||
| E-MAIL | xxxx.xxxx@xxxx.co.jp ||
| | | FROM START TO END<br>PRICE VARIABLE RANGE<br>¥2,500-～¥1,000<br>CURRENT APPLICATION AMOUNT<br>¥2,000- |
| | VENUE:<br>○○ BUDOKAN | COMPETITIVE RATIO AS OF<br>11:00 APR. 1, 2003:<br>1.0<br>SOLD OUT |
| | VENUE:<br>××ARENA | COMPETITIVE RATIO AS OF<br>11:00 APR. 1, 2003:<br>0.9<br>A FEW SEATS ARE AVAILABLE |
| DESIRABLE PURCHASE TICKET |||
| TIME SELECTION | VENUE SELECTION | CAMERA SELECTION |
| START TO END<br>0:30 DELAY<br>1:00 DELAY<br>1:30 DELAY | ○○ BUDOKAN<br>×× ARENA | ENTIRETY<br>RANDOM<br>VOCAL<br>DRUM |

- PURCHASE TICKET PRICE VARIES.
- TICKETS ARE SOMETIMES SOLD OUT JUST BEFORE APPLICATION EVEN IF VACANT SEATS ARE DISPLAYED ON SCREEN. CONTENTS OF TICKET SHOULD BE CONFIRMED BY MAIL SENT AFTER APPLICATION.

☑ ALLOWANCE OF REDISTRIBUTION (REFUND IS PRESENT *1)
☑ AUTOMATIC RECONNECTION *2

*1 AMOUNT OF MONEY IS DECIDED BY REDISTRIBUTION NUMBER.
*2 RECONNECTION IS AUTOMATICALLY MADE WHEN RECOVERY FROM DISCONNECTION DUE TO COMMUNICATION TROUBLE IS ACHIEVED.

| APPLICATION |

FIG. 19B

| PURCHASE INFORMATION ||
|---|---|
| 30 MINUTES DELAY FROM START PRICE VARIABLE RANGE ¥2,300-~¥1,000 CURRENT APPLICATION AMOUNT ¥2,300- | 1 HOUR DELAY FROM START PRICE VARIABLE RANGE ¥2,100-~¥1,000 CURRENT APPLICATION AMOUNT ¥2,100- |
| COMPETITIVE RATIO AS OF 11:00 APR. 1, 2003: 0.9 A FEW SEATS ARE AVAILABLE | COMPETITIVE RATIO AS OF 11:00 APR. 1, 2003: 0.5 VACANT SEATS ARE AVAILABLE |
| COMPETITIVE RATIO AS OF 11:00 APR. 1, 2003: 0.9 A FEW SEATS ARE AVAILABLE | COMPETITIVE RATIO AS OF 11:00 APR. 1, 2003: 0.5 VACANT SEATS ARE AVAILABLE |

FIG. 19C

| 1 HOUR AND HALF DELAY FROM START<br>PRICE VARIABLE RANGE<br>¥1,900-~¥1,000<br>CURRENT APPLICATION AMOUNT<br>¥1,900- | 1 HOUR AND HALF DELAY FROM START<br>PRICE VARIABLE RANGE<br>¥1,900-~¥1,000<br>CURRENT APPLICATION AMOUNT<br>¥1,900- |
|---|---|
| COMPETITIVE RATIO AS OF<br>11:00 APR. 1, 2003:<br>0.3<br>VACANT SEATS ARE AVAILABLE | COMPETITIVE RATIO AS OF<br>11:00 APR. 1, 2003:<br>0.3<br>VACANT SEATS ARE AVAILABLE |
| COMPETITIVE RATIO AS OF<br>11:00 APR. 1, 2003:<br>0.3<br>VACANT SEATS ARE AVAILABLE | COMPETITIVE RATIO AS OF<br>11:00 APR. 1, 2003:<br>0.3<br>VACANT SEATS ARE AVAILABLE |

FIG.20A

<PATTERN INFORMATION TABLE>

| IMAGE PATTERN | PATTERN | EFFECT | ZOOM | ... |
|---|---|---|---|---|
| PATTERN A | NORMAL | NO | YES | ... |
| PATTERN B | IDEA 1 | YES | NO | ... |
| PATTERN C | IDEA 2 | YES | YES | ... |
| ... | ... | ... | ... | ... |

FIG.20B

<DISTRIBUTION DESIRING PERSON INFORMATION TABLE>

| NAME OF DISTRIBUTION DESIRING PERSON | ID CODE | PRESENCE OR ABSENCE OF DESIGNATION | DESIGNATION INFORMATION | RECEPTION TIME AND DATE | DISTRIBUTION | ACCOUNTING INFORMATION | ... |
|---|---|---|---|---|---|---|---|
| AAA | ***** | NO | | yymmdd | PRIMARY | *** | ... |
| BBB | ***** | YES | ○○ MAIN | yymmdd | PRIMARY | *** | ... |
| CCC | ***** | YES | △△ UP | yymmdd | PRIMARY | *** | ... |
| ... | ... | ... | ... | ... | ... | ... | ... |
| ZZZ | ***** | YES | ○○ MAIN | yymmdd | PRIMARY | *** | ... |
| ... | ... | ... | ... | ... | ... | ... | ... |

FIG.20C

<PATTERN INFORMATION TABLE>

| RANK | DESIGNATION INFORMATION | CASES | CATEGORY |
|---|---|---|---|
| 1 | ○○ | 30 | PATTERN B |
| 2 | △△ | 20 | PATTERN C |
| ... | ... | ... | ... |
| N | □□ | 5 | PATTERN N |

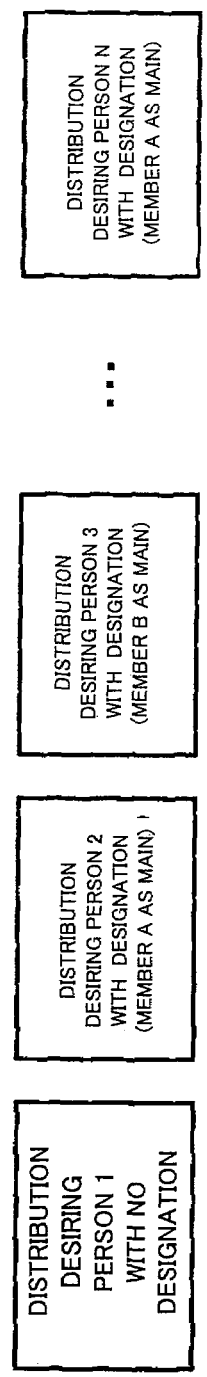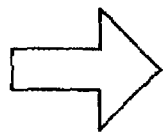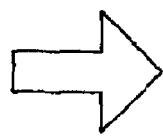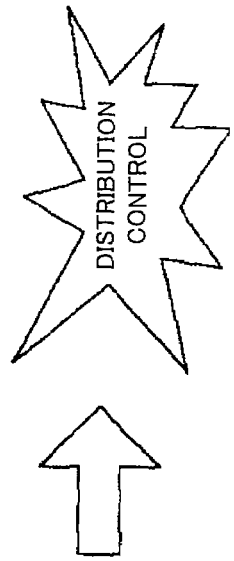
FIG.21A
FIG.21B
FIG.21C

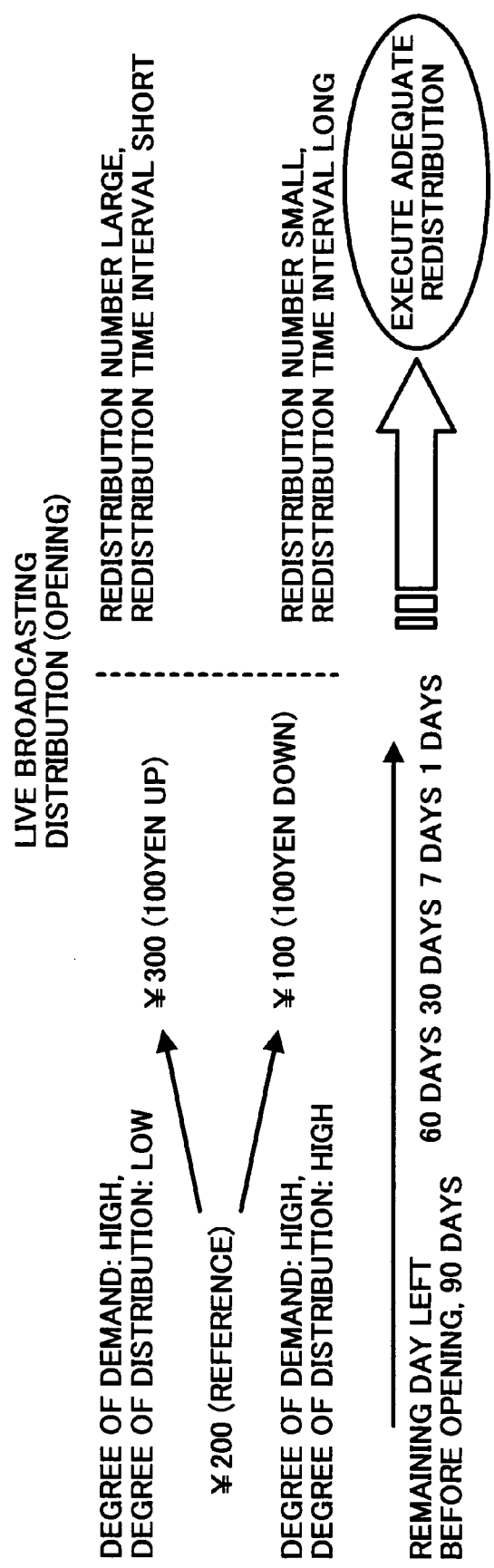

DIGITAL CONTENTS DISTRIBUTING SYSTEM AND DISTRIBUTING METHOD

BACKGROUND OF THE INVENTION

1. Field of the Invention

The present invention relates to a technique of distributing digital contents.

2. Description of the Related Art

There is known the contents distribution system that distributes contents to multiple receiving terminals from a contents server via a communication network. In this system configuration, the contents server distributes the digital contents to the multiple receiving terminals via the network. In the conventional distribution technique, it is only the contents server that possesses the contents to be distributed, and all other terminals are apparatuses that receive the contents. However, when demands for distribution concentrate on specific contents that the contents server possesses or demands for distribution of a large amount of contents occur, this system configuration cannot distribute speedily because of an increase in the amount of transmission.

In order to solve this problem, Unexamined Japanese Patent Application KOKAI Publication No. 2002-269386 discloses the following technique. Namely, 1) a user, who desires to distribute contents, and a user, who desires to receive contents exchange information, through an electronic bulletin board provided by the distribution server; 2) the user, who desires to receive contents, sends the contents to the distribution server; and 3) the distribution server transmits the contents to the user, who desires to receive the contents, and pays the cost to a copyright holder and provides lots to the contents provider. However, in this system configuration, replicated contents will be easily redistributed.

Unexamined Japanese Patent Application KOKAI Publication No. 2002-269461 discloses the following technique. Namely, one terminal that received distribution from a contents sever performs distribution to another terminal by a peer-to-peer communication, pays a predetermined amount of money as a using feed to a owner of one terminal, to, for example, offset an amount of money to be paid at the time of receiving distribution from the contents server, thereby providing a profit to a user to encourage a legal distribution.

However, in the technique disclosed in Unexamined Japanese Patent Application KOKAI Publication No. 2002-269461, complicated procedures are required such as registration to the contents server is needed at the time of performing distribution from the terminal. Moreover, at the time of collecting fees, another procedure is needed and, for example, bank transactions and credit cards are used. For this reason, users, who did not easily conduct such transactions such as young people, did not smoothly execute the distribution of contents.

SUMMARY OF THE INVENTION

The present invention has been made in consideration of the aforementioned problems, and an object of the present invention is to protect the right relating to digital contents as expediting the distribution of contents.

Moreover, an object of the present invention is to enable a user to distribute digital contents with a small load.

According to a first aspect of the present invention, a contents distribution support system of the present invention includes a contents server and a plurality of terminals connected to the contents server via a network to allow contents to be distributed to the terminal from the contents server and further allow the contents to be distributed to another terminal from the terminal that received the distribution. The contents server includes a storing section that stores information on the terminal that received the distribution of the contents, and any one of terminals stored in the storing section is selected to distribute the stored contents to another terminal.

According to a second aspect of the present invention, a contents distribution support system of the present invention includes a contents server and a plurality of terminals connected to the contents server via a network to allow contents to be distributed to the terminal from the contents server and further allow the contents to be distributed to another terminal from the terminal that received the distribution. The contents server includes a storing section that stores information on the terminal that received the distribution of the contents, a terminal stored in the storing section is selected to distribute the contents to another terminal based on information on a distribution state from the contents server.

The storing section may grasp identification information on the terminal that received the distribution of the contents and information on a communication state of the terminal to store these information, and distribution to another terminal may be executed in such a manner that a terminal similar to the communication state is selected.

The contents server may include a communication monitoring section that monitors the communication state between the selected one terminal and another terminal. When interruption of the communication is judged by the communication monitoring section, selection may be executed again based on information on the terminal stored in the storing section.

A storage media having at least one of a read-only storage area and a rewritable storage area may be used, a program for gaining access to the contents server via the network to the read-only storage area, a storing section of a prepaid amount may be provided in the rewritable storage area and an arbitrary amount is subtracted or added from/to the prepaid amount according to the distribution or reception of the contents, and the subtracted or added amount may be stored in the storing section of the prepaid amount.

The contents distribution support system may further comprises an amount setting section that fixes an amount to be subtracted or added.

The amount fixed by the amount setting section may be set according to a frequency of the distribution or reception of the contents or a distribution time period of the contents.

The contents server may include a communication monitoring section that monitors the communication state between the selected one terminal and another terminal, and when interruption of the communication is judged by the communication monitoring section, selection may be executed again based on information on the terminal stored in the storing section, and the amount setting section may fix the amount to be added by dividing the amount according to a contents size before the communication is interrupted and a contents size after the communication is interrupted.

The read-only storage area may store a program for allowing the distributed contents to be reproduced.

The contents server may include a section that obtains information indicating the distribution state executed by each terminal.

The contents distribution support system may further comprises an accounting storing section that subtracts or adds an arbitrary amount from/to the prepaid amount according to the distribution or reception of the contents, and may store the subtracted or added amount.

The contents distribution support system further comprises an amount setting section that arbitrarily fixes the amount to be subtracted or added, and the amount fixed by the amount setting section may be set according to the distribution state obtained by the obtaining section.

The contents server may include a storing section that stores information on the terminal that received the distribution of the contents from the contents server, a first selecting section that selects a primary terminal based on information stored in the storing section and an arbitrary reference at the time of executing a synchronous distribution of the contents, and a second selecting section that selects secondary and afterward terminals sequentially based on information stored in the contents server in connection with the selected primary terminal.

The terminal may includes a display section, and a screen that receives a desire for a rank of the contents distribution of the primary terminal and/or secondary and afterward terminals and the accounting information to be subtracted or added are displayed on the display section.

The contents server may include a storing section that stores information on the terminal that received the distribution of the contents and information on the distribution state to be associated with each other, a receiving section that receives a terminal that receives a request for distributing the contents in advance at the time of executing a synchronous distribution of the contents, a counting section that counts a plurality of edit patterns in connection with the synchronously distributed contents included in the received distribution request, and a deciding section that decides a scale of the distribution including at least primary or secondary and afterward distribution ranges and distribution frequencies of the contents according to the result of the counting section.

The contents distributed from one terminal that received the initial synchronous distribution of the contents can be transmitted to further another terminal according to the passage of a fixed time, and the number of primary terminals selected based on the stored information and an arbitrary reference may be decided according to the edit pattern.

The secondary and afterward terminals may be sequentially selected according to the edit pattern in connection with the selected primary terminal.

Selection of the terminal may is executed from the terminals that applied for the distribution of the contents in advance based on the information stored in the contents server, and at the time of application in advance, at least a desire for a rank of the contents distribution of the primary terminal and/or secondary and afterward terminals is received, and the condition of the distribution may be made different according to the rank of the contents distribution of the primary terminal and secondary and afterward terminals.

The terminal may include a display section and the display section may include a section that receives a desire for a rank of the contents distribution of the primary terminal and/or secondary and afterward terminals.

The terminal may use a storage media having a read-only storage area and a rewritable storage area and may subtract or add amount information corresponding to amount information stored in a storage area of a prepaid amount that is formed in the rewritable storage area according to the distribution or reception of the contents, and may store the subtracted or added amount information to the storage area of the prepaid amount according to an application program for gaining access to the contents server stored in the read-only storage area via the network.

The terminal may include a display section, and a screen that receives a desire for a rank of the contents distribution of the primary terminal and/or secondary and afterward terminals and the accounting information to be subtracted or added are displayed on the display section.

According to a third aspect of the present invention, a terminal apparatus of the present invention is a computer apparatus that downloads predetermined contents from an apparatus of a connection destination. The terminal includes a connecting section that connects to a predetermined connection destination via communication. The terminal further includes a transmitting section that transmits user information on the computer user and information that specifies the contents stored in the terminal. The terminal further includes a display section that displays an object contents list received according to the transmission based on set display information.

According to a fourth aspect of the present invention, a terminal apparatus of the present invention registers contents requested from an apparatus of a connection destination. The terminal includes a connecting section that makes connection to the connection destination based on connection destination information included in setting information extracted according to an input authentication result. The terminal further includes a transmitting section that transmits user information included in the setting information and user information including at least a contents list, accounting information and apparatus information to the connected connection destination. The terminal further includes a registering section that registers the contents when information on the request for distributing the contents is received by the result of transmission. The terminal further includes an accounting section that executes accounting according to the state of the transmission result when the requested contents is transmitted by the result of the registration. The terminal further includes a writing and transmitting section that writes information on the reception to the setting information to transmit to a transmission destination of the contents list.

According to a fifth aspect of the present invention, a contents distribution support method of the present invention executes a synchronous distribution from a contents server via a network to further allow the contents to be distributed to another terminal from one terminal that received an initial synchronous distribution of the contents according to the passage of a fixed time period. The method includes the steps of storing information on the terminal that that received the initial synchronous distribution of the contents and information on the distribution state to be associated with each other; selecting a primary terminal based on the stored information and an arbitrary reference at the time of executing the synchronous distribution of the contents, and selecting secondary and afterward terminals based on information stored in the storing section in connection with the selected primary terminal.

According to a sixth aspect of the present invention, a contents distribution support program executes a synchronous distribution from a contents server via a network to further allow the contents to be distributed to another terminal from one terminal that received an initial synchronous distribution of the contents according to the passage of a fixed time period, the program executes the steps of storing information on the terminal that that received the initial synchronous distribution of the contents and information on the distribution state to be associated with each other, selecting a primary terminal based on the stored information and an arbitrary reference at the time of executing the synchronous distribution of the contents, and selecting secondary and afterward terminals based on information stored in the storing section in connection with the selected primary terminal.

BRIEF DESCRIPTION OF THE DRAWINGS

These objects and other objects and advantages of the present invention will become more apparent upon reading of the following detailed description and the accompanying drawings in which:

FIG. 2 is a block diagram of a distribution server of FIG. 1;

FIG. 3A is a view illustrating an example of user information stored in the distribution server;

FIG. 3B is a view illustrating an example of contents information stored in the distribution server;

FIG. 5 is an explanatory view of a storage media illustrated in FIG. 1;

FIG. 12 is a configuration view of accounting information and historical data stored in a user terminal;

FIG. 13 is a flowchart explaining an initial operation, FIG. 14 is a flowchart explaining processing for transmitting contents, and FIG. 15 is a flowchart explaining processing for requesting and receiving contents executed by a terminal apparatus 3 and accounting processing;

FIGS. 17A to 17D are views each illustrating an example of a database formed in a contents holder terminal;

FIGS. 18 and 19 are views each explaining an example of an application screen at the time of applying the distribution of contents in a contents distribution system of a third embodiment of the present invention;

FIGS. 20A to 20C are view each explaining a contents editing method for distributing live contents;

FIG. 21 is a view explaining processing for editing contents according to a favorite which one, who desires distribution, has;

FIG. 22 is a view explaining steps of deciding a contents cost;

FIG. 23 is a flowchart explaining an operation of a contents server;

FIG. 24 is a flowchart explaining an operation of a user terminal, and FIG. 24 is a flowchart explaining an operation of a contents holder terminal;

DETAILED DESCRIPTION OF THE PREFERRED EMBODIMENTS

First Embodiment

The following will explain a contents distribution support system, contents distribution support method and contents distribution support program according to one embodiment of the present invention with reference to the drawings.

Figure 1:
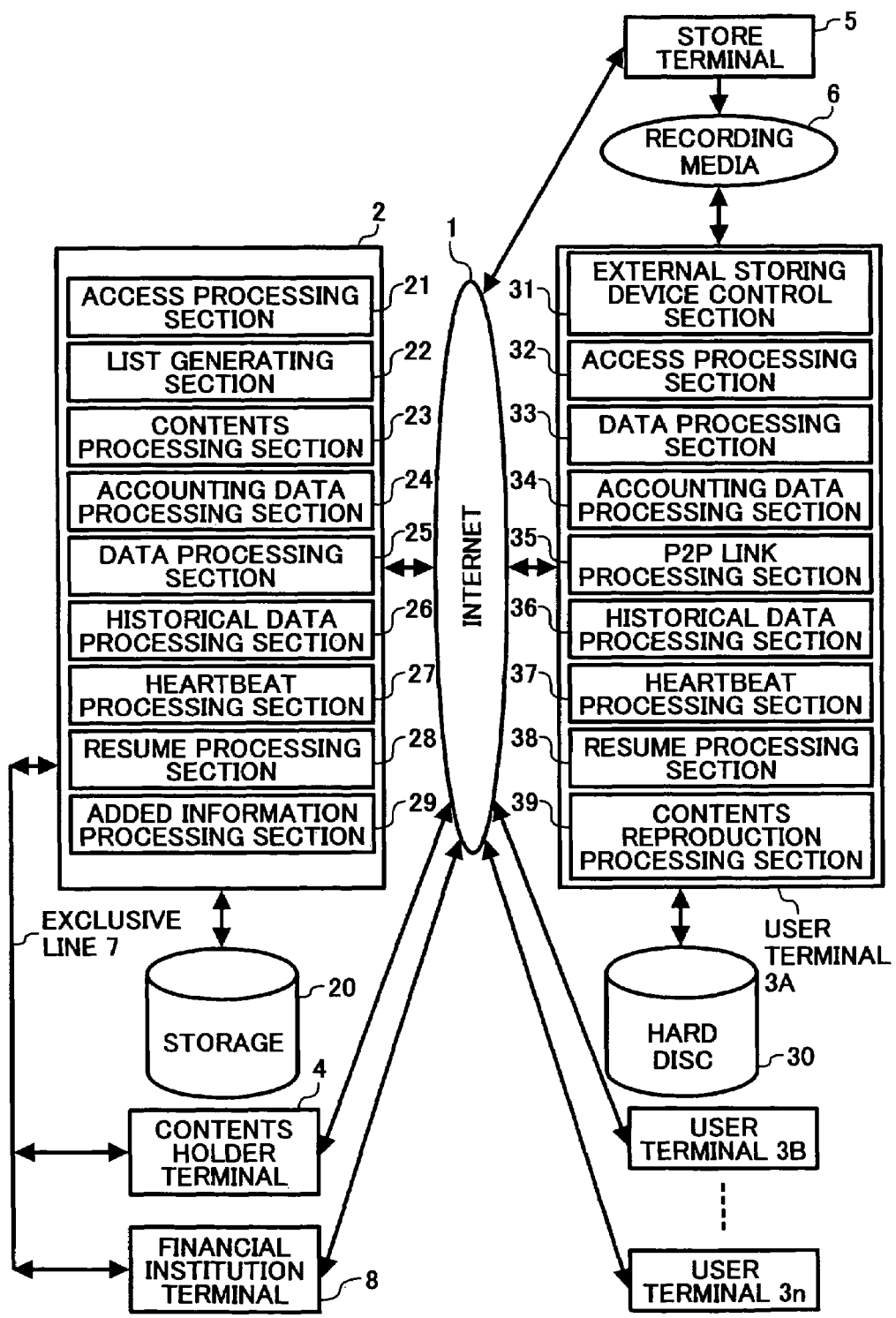
FIG. 1 is a block diagram of a contents distribution system according to a first embodiment of the present invention.

As illustrated in FIG. 1, a contents distribution support system according to the present embodiment includes a contents server 2, multiple user terminals 3 (3A, 3B, ... 3n), a holder terminal 4, a store terminal 5, and a financial institution terminal 8. The contents server 2, the user terminals 3, the holder terminal 4, the store terminal 5 and the financial institution terminal 8 are connected to one another via the Internet 1, an ISP (Internet Service provider) (not sown), and the like.

The contents server 2 is provided in a distribution center for distributing contents and collecting and distributing copyright fee.

As illustrated in FIG. 1, from the functional viewpoint, the contents server 2 includes an access control section 21 that performs control of login for users such as authentication of an access key and processing on a peer-to-peer communication link, a list generating section 22 that generates a list based on each user's setting, a contents processing section 23 that protects and encrypts the originality of contents under a commission from a copyright holder and executes encoding for added information processing, a charging data processing section 24, a data processing section 25 that uploads data and aggregates contents that can be distributed to the user terminal, a historical data processing section 26 that executes processing for historical data matching of the user terminal side, a heartbeat processing section 27 that executes reception processing of heartbeat communication to grasp an operating rate of the user terminal, a link band information, a reception and transmission condition, and the like, a resume processing section 28 that executes processing such as a retry of the user terminal due to interruption of transmission and reception, a change in link destination of the peer-to-peer communication and the like, and an added information processing section 29 that executes processing for information on user's evaluation on the contents, a bulletin board and the like The access control section 21 performs control of login for users such as authentication of an access key and processing on the peer-to-peer communication link.

The list generating section 22 generates the list based on each user's setting.

The contents processing section 23 protects and encrypts the originality of contents under a commission from a copyright holder and executes encoding for added information processing.

The charging data processing section 24 executes withdrawal of a fee after the end of reception and interruption, storage of a fee after the end of reception and interruption, withdrawal of a fee at the time of reproducing contents with no download history, processing for a match to accounting data of the user terminal side, and settlement processing on replenishing a prepaid amount between the user and the financial institution.

The data processing section 25 uploads data and aggregates contents that can be distributed to the user terminal.

The historical data processing section 26 executes matching processing between historical information stored in the contents server 2 and historical data stored in each user terminal 3.

The heartbeat processing section 27 executes reception processing of heartbeat communication to grasp an operating rate of the user terminal, the link band information, the reception and transmission condition, and the like.

The resume processing section 28 executes processing such as the retry of the user terminal due to interruption of transmission and reception, the change in link destination of the peer-to-peer communication and the like.

The added information processing section 29 executes processing for information on user's evaluation on the contents, a bulletin board and the like.

Moreover, a storage device 20 is connected to the distribution server 2. The storage device 20 stores the database of user information, database of contents information, database of user distributable contents, database of store information, database of distribution record, and the like.

FIG. 2 illustrates a configuration example of the distribution server 2. As illustrated in the figure, the distribution server 2 includes a communications section 210, a storing section 220, and a controller 230.

The communications section 210 exchanges information between the communications section 210 and the other terminal via the Internet under control of the controller 230.

The storing section 220 stores an operating program of the controller 230 and functions as a work area of a processor that forms the controller 230.

The controller 230 is formed of the processor and the like and executes the operating program stored in the storing section 220 to implement the respective functioning sections.

Moreover, the storage device 20 is connected to the distribution server 2. The storage device 20 stores a database of user information, a database of contents information, a database of user distributable contents, a database of store information, and a database of distribution record.

As illustrated in FIG. 3A, the database of user information stores information on users such as authentication information, for example, a preregistered user ID, a password, contents that the user possesses, an IP address, historical information, and a possession point.

As illustrated in FIG. 3B, in connection with the respective contents, the contents information database includes a contents name, a contents ID, a summary and/or thumbnail, writer information, a unit cost, distributable person information (an IP address of contents contributable person, equipment information of the user, etc), historical information and the like.

The store information is information on the store that sells the respective storage media 6.

The database of distribution record is a database of contents distribution record.

The user terminals 3 (3A, 3B . . . 3n) are terminals that are used by a person who desires the distribution of the contents or a person who receives the distribution of contents, and from the functional viewpoint, includes an external storing device control section 31, an access processing section 32, a data processing section 33, an accounting data processing section 34, a P2 link processing section 35, a historical data processing section 36, a heartbeat processing section 37, a resume processing section 38, and a contents reproduction processing section 39.

The external storing device control section 31 executes exclusive control of storage data.

The access processing section 32 logs into the distribution server 2 by transmission of an access key, transmits a possessing contents list and fee information, demands contents holder, and requests distribution.

The data processing section 33 requests the display of the contents list and the customerization of the list, writes and reads the distribution contents.

The accounting data processing section 34 withdraws the fee after the end of reception and interruption, stores the fee after the end of reception and interruption, and withdraws the fee at the time of reproducing contents with no download history.

The P2P link processing section 35 receives link destination information of the peer-to-peer communication link and establishes the peer-to-peer communication link, respectively.

The historical data processing section 36 executes processing such as updating time and date of connection to the distribution server 2, adding starting/interrupting/ending time and date of download/upload, adding time and date of purchasing contents at the store, matching to the history of the distribution server (center 2) side at the time of interruption of download/upload.

The heartbeat processing section 37 periodically transmits the operating rate of the user terminal, the link band information, the reception and transmission condition and the like, respectively.

The resume processing section 38 executes comparison in uncompleted contents and replenishment processing.

The contents reproduction processing section 39 confirms the originality of contents and refers to historical data, delivers the fee to the accounting data processing section 34 and reproduces the contents when there is no download history.

Moreover, each user terminals includes a hard disc drive 30, and stores data at the aforementioned processing section.

Figure 4:
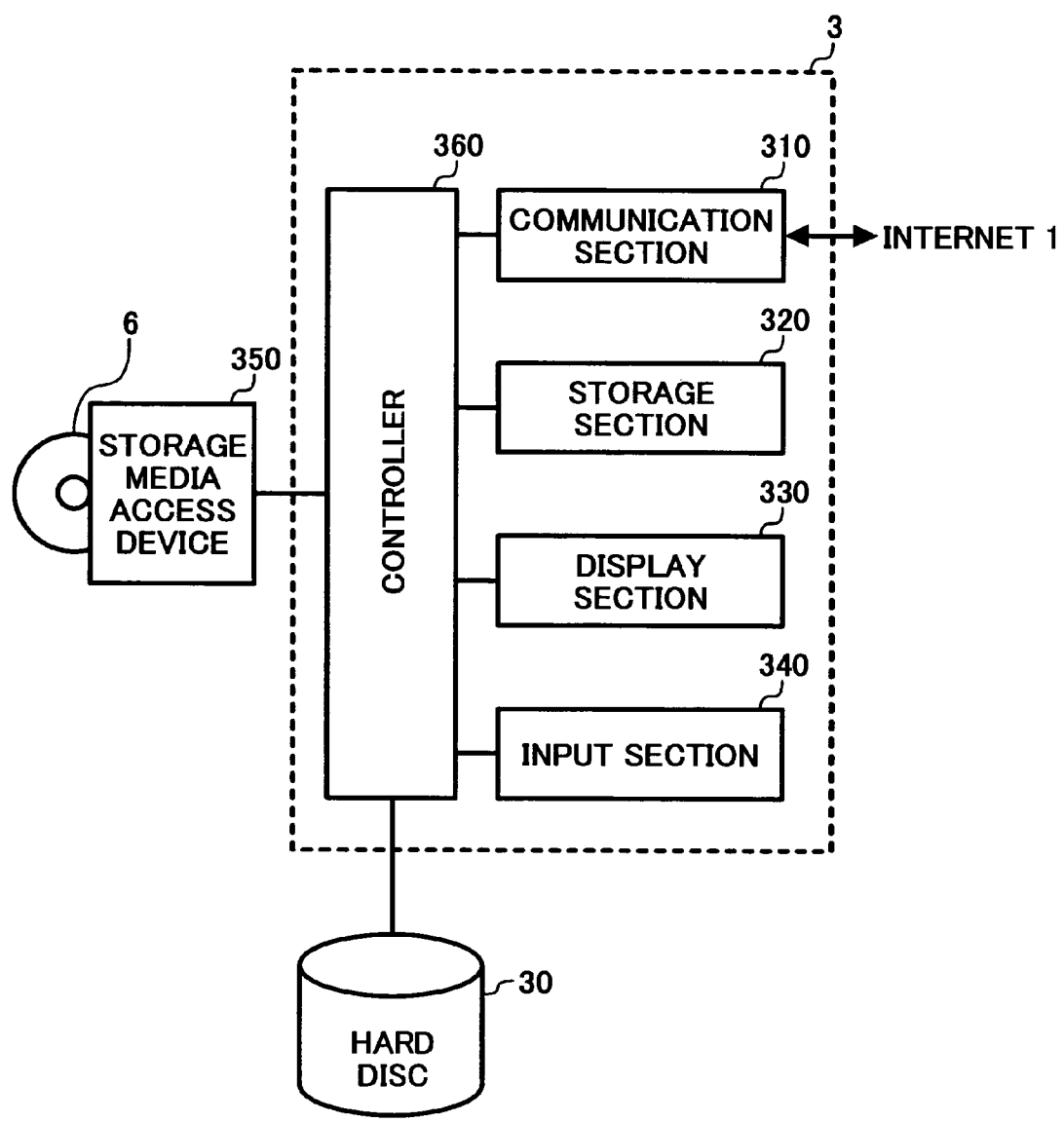
FIG. 4 is a block diagram of a user terminal of FIG. 1.

As illustrated in FIG. 4, each user terminal 3 physically includes a communications section 310, a storing section 320, a display section 330, an input section 340, a storage media access device 350, and a controller 360.

The communications section 310 exchanges information between the communications section 310 and the other terminal via the Internet 1 under control of the controller 360.

The storing section 320 stores an operating program of the controller 360 and functions as a work area of a processor that forms the controller 240.

The display section 330 displays various information items.

The input section 340 inputs various information items.

The storage media access device 350 reads data recorded on a storage media 6 to be described later and records data on the storage media 6.

The controller 360 is formed of the processor and the like and executes the operating program stored in the storing section 320 to implement the respective functioning sections.

The contents holder terminal 4 is a terminal for a contents holder that is a copyright holder, and is connected to the other terminal via the Internet 1 and connected to the distribution server 2 and the financial institution terminal 8 via an exclusive line 7. The contents holder terminal 4 transmits new contents to the distribution server 2 via the exclusive line 7. Moreover, the contents holder terminal 4 receives information on the contents distribution (sale) from the distribution server 2 and information on deposits from the financial institution terminal 8.

The store terminal 5 is a terminal that is provided at the store as a service store that registers an initial user and runs a direct selling. The store terminal 5 is formed of a general computer terminal having a communications function. The storage media 6 is sold at the store (not shown) having the store terminal 5.

The storage media 6 is formed of, for example, a disc-like optical storage medium and includes a read only memory (hereinafter referred to as ROM) area, a random access memory (hereinafter referred to as RAM) area. The ROM area and the RAM area are formed of, for example, a different characteristic optical disc.

As illustrated in FIG. 5, a ROM area 6A of the storage media 6 includes a function (engine) for assuring the originality including an original authentication processing section, an originality checking section, software for transmitting and receiving the contents including a server access processing section, a peer-to-peer link processing section, an accounting information processing section, other settings, user information, and software for reproducing the contents including a download history checking section, a reproduction processing section and an accounting information processing section.

Moreover, as illustrated in FIG. 5, a RAM area 6B of the storage media 6 stores an access key, which is a unique authentication code, accounting information, history including download, upload, store purchase and fee replenishment and includes a user using area.

In addition, each of these ROM area and RAM area has an arbitrary storage capacitance. For example, the ROM area has a storage capacitance of 350 MB and the RAM area has a storage capacitance of 300 MB. However, any size may be possible. Moreover, regarding the configuration of the RAM area, a configuration in which only one writing is possible or erasing and rewriting are freely possible can be used.

Then, the user of this system inserts the storage media 6 purchased from the sales store (not shown) into the user terminal 3, and a procedure for participating in the present system is thereby conducted. Namely, the aforementioned media 6 is inserted into the user terminals 3A, 3B, . . . 3n connected to the Internet 1, and processing as illustrated in the flowchart of FIG. 3 is thereby executed.

The financial institution terminal 8 is a terminal provided in the financial institution such as a credit card company, a bank, and the like and is connected to the other terminal via the Internet 1. Moreover, the financial institution terminal 8 is connected to the distribution server 2 and the contents holder terminal 4 via the exclusive line 7. The financial institution terminal 8 withdraws a purchase price from the contents purchaser's account and transmits information on the payment to the contents holder to the contents holder terminal 4.

An explanation of this system, that is, the digital contents distribution method using this contents distribution support system will be next explained.

When the writer generates the contents to be distributed, he/she transmits it to the distribution server 2 via the exclusive line 7 together with information that specifies the writer, information on the writer's account, using fee (distribution fee) and the like.

The distribution server 2 registers this to the contents database in the storage 20 shown in FIG. 1. At this stage, a distributable terminal is only the distribution server 2.

A person, who wishes to receive the distribution of the digital contents using this distribution support system, purchases the storage media 6 at the store and sets it to the storage media access device 330 of his/her terminal 3.

Figures 6A, 6B:
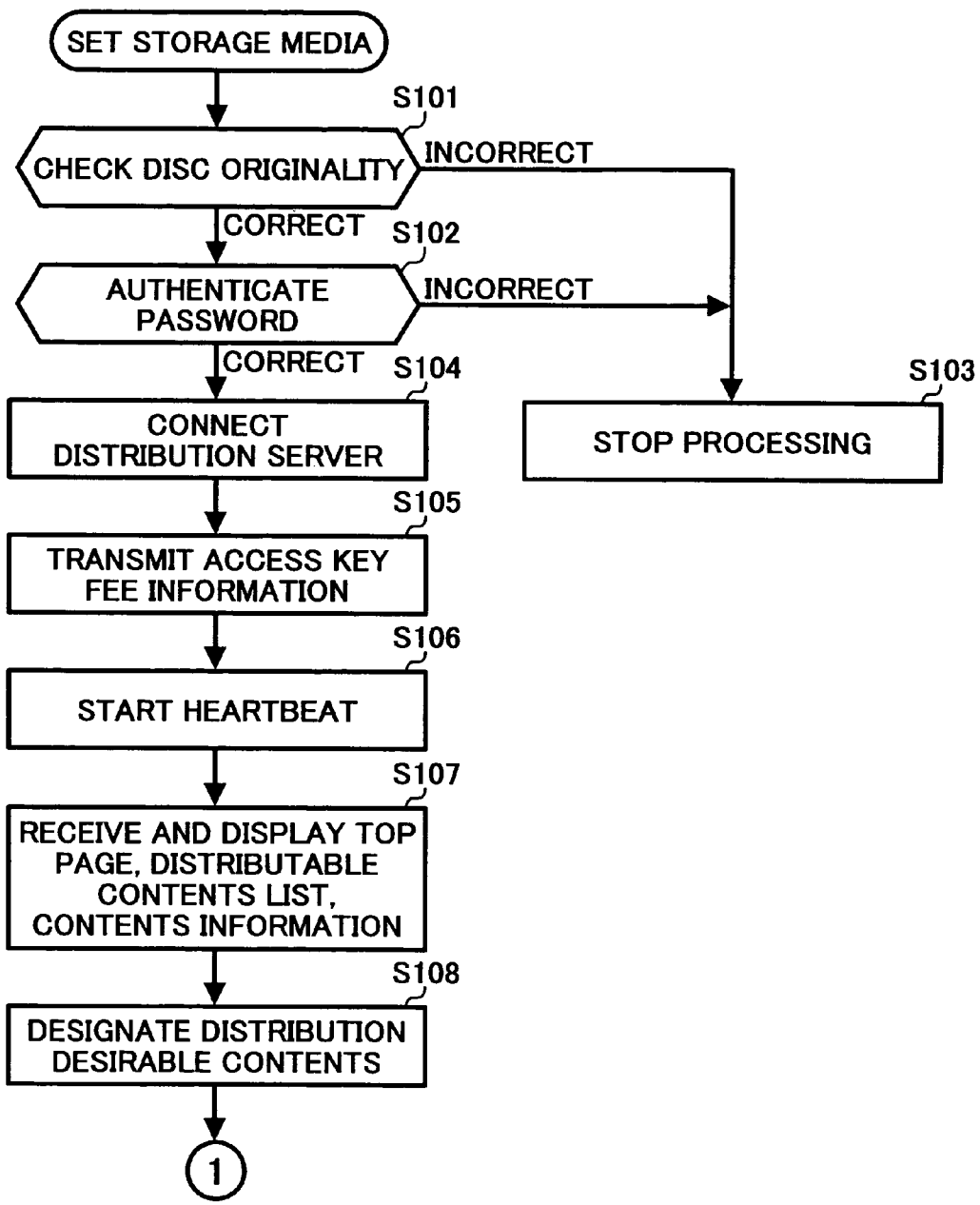
FIG. 6 is a flowchart explaining an operation of an apparatus that receives contents in a contents distribution system.
Figure 6B:
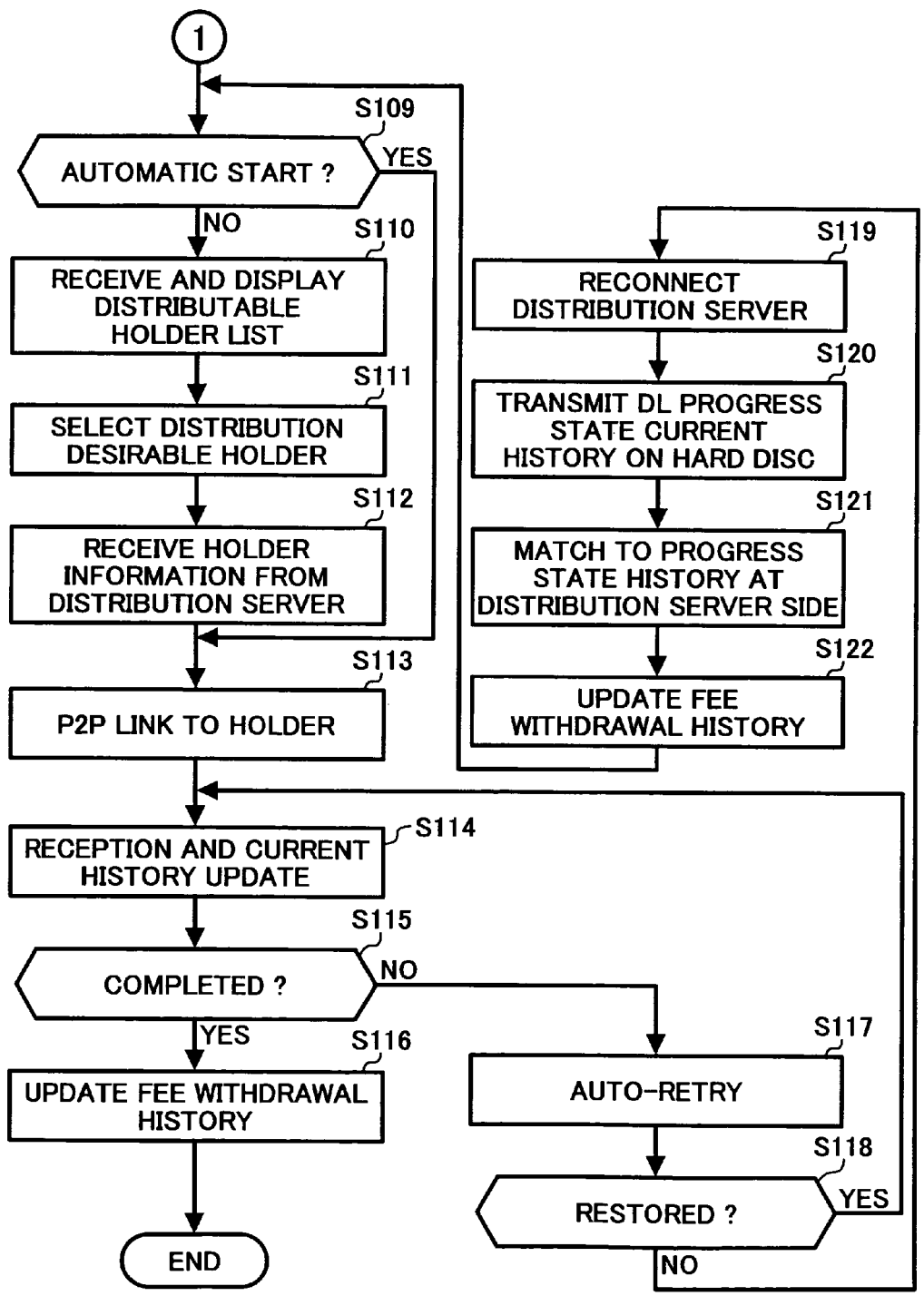

The controller 360 starts the operating program stored in the ROM area of the storage media 6 to execute processing as illustrated in the flowchart of FIG. 6.

First of all, information prerecorded in the ROM area is checked whether the storage media 6 is one that is legally generated and sold instead of a replica (originality check) (step S101). Additionally, the method of checking the originality is arbitrarily used.

When it is checked that the storage media 6 is the original (correct), the controller 360 requests the user to input a password and determines whether the input password coincides with the password registered in the storage media (step S102).

When the password is correct, the operation of the contents is started by the terminal 3. In addition, when it is determined that they are incorrect in steps S101 and S102, processing is stopped in step S103.

In step S102, when the password is correct, the controller 360 executes contents reception software stored in the ROM area of the storage media 6 to connect to the distribution sever 2 via the communications section 310 and the Internet 1.

Next, in step S105, the access key recorded on the storage media 6, fee information, and a list of contents selected from among the lists of the possessing contents stored in the terminal 3 by the user are transmitted. Moreover, in step S106, the heartbeat communication is started. By the heartbeat communication, the communication state of the terminal 3 is sent to the distribution server 2, so that the distribution server 2 grasps communication state of the terminal 3.

When the terminal 3 is connected thereto, the distribution server 2 transmits a predetermined top page to the terminal 3. The top page includes information on the list of the distributable contents.

The terminal 3 receives the top page and displays it on the display section device in step S107.

The terminal 3 designates the contents designating the contents to be desirably distributed from the displayed list (step S108).

The controller 360 judges whether "automatic start" is selected (step S109). When it is not selected (step S109; No), the controller 360 requests the distribution server 2 to send the holder list (list table) of the distributable contents. The distribution server 2 sends the list in response to the request.

The controller 360 receives the holder list of the distributable contents (list table) and displays it (step S110). The user selects a desired distribution holder in step S111.

Then, the controller 360 requests the terminal 3, which is the selected desired distribution processor, to establish the peer-to-peer link (step S113).

After establishing the peer-to-peer link, the controller 360 downloads the contents from the terminal 3 as a connecting destination (step S114). Then, the controller 360 updates historical data stored in the RAM area of the storage media 6 (adds information on this download) (step S114). Moreover, the controller 360 judges whether the download (reception) is completed in step S115. When the download is completed (step S115; Yes), the fee is withdrawn and historical data is updated, so that processing ends in step S116.

Moreover, when the download is not completed (reception is not completed (step S115; No), the controller 360 determines whether the peer-to-peer communication is interrupted in step S116. When it is interrupted, the controller 360 executes an auto-retry in step S117 and judges whether the peer-to-peer communication is restored in step S118. Then, when it is restored (step S118; Yes), the processing is returned to step S114, and the download (reception) of the contents and the update of historical data are executed.

While, when the peer-to-peer communication is not restored (step S118; No), reconnection to the distribution server 2 is made in step S119, and the progress state of the download on the hard disk 120 and the current history are sent to the distribution server 2 in step S120. Then, in step S121, the controller 360 executes matching processing between the history of the progress state of the download stored in the distribution server 2 and the history stored in the terminal 3. For example, the controller 360 controls the history stored in the distribution server 2 to match the history stored in the terminal 3.

Namely, since the distribution server grasps the communication state of the terminal 3 by the aforementioned heartbeat communication, matching to the history of the progress state of the download of the distribution sever 2 is executed, thereby the size of the distributed contents is determined before interruption occurs. Then, in step S122, the withdrawal of the fee and the update of historical data are executed according to the size of the distributed contents.

Moreover, after step S122, the processing is returned to step S109. Accordingly, in the second processing, for example, only the portion of the contents after interruption is received excepting for the distributed contents before interruption occurs in step S24. Moreover, the withdrawal of the fee and the update of historical data are executed to only the portion of the contents after interruption, and processing is ended.

In this way, the contents are downloaded (received). Then, in this case, even if the reception of contents is interrupted, a communication partner in the peer-to-peer communication is changed, so that the reception is continued. Also, since the withdrawal of the fee at this time is divided according to the size of the received contents, an excellent download (reception) can be executed even in an unstable network.

In addition, when the peer-to-peer communication is not restored in step S118 and reconnection to the distribution server 2 cannot be made in step S119, processing in steps S119 to S122 is executed when the terminal 3 is next connected to the distribution server 2.

Figure 7:
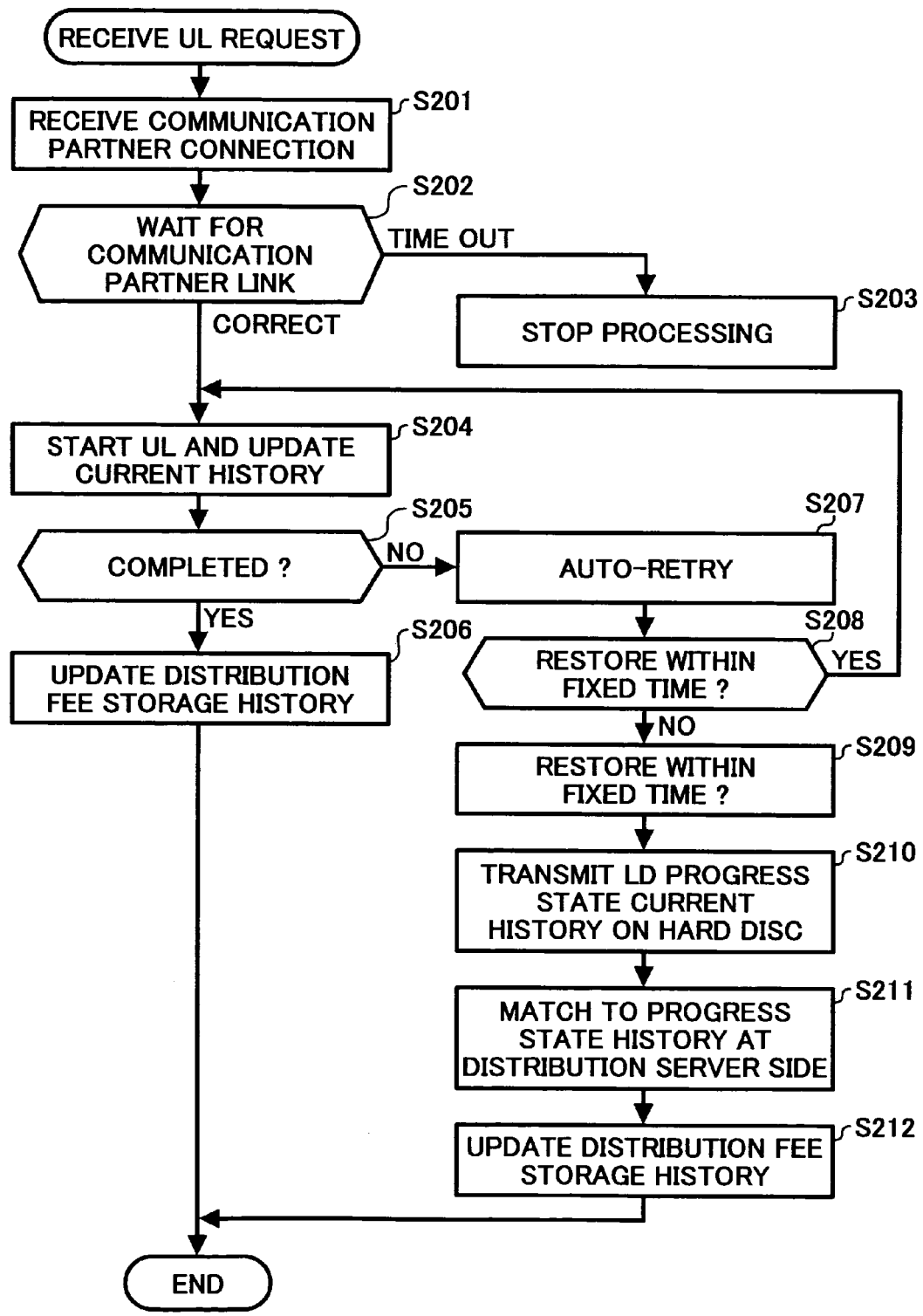
FIG. 7 is a flowchart explaining an operation of an apparatus that distributes (transmits) contents in a contents distribution system.

Furthermore, the aforementioned flowchart of FIG. 6 relates to processing at the user terminal 3 that is the receiving side that receives the distribution (download). On the other hand, at the user terminal 3 that is the distribution source side that conducts the distribution (download), processing as illustrated in a flowchart of, for example, FIG. 7 is executed.

First of all, when a connection request is received from the terminal 3, information on the terminal 3 as a communication partner is first received in step S201. When communication partner link is in a standby state and there is no link within a predetermined time (timeout) in step S202, processing stops in step S203. While, when there is a link within a predetermined time (connection), the contents are uploaded (distributed) and current historical data is updated in step S204.

Moreover, it is judged whether the upload (distribution) of the contents is completed in step S205. When it is completed (step S205; Yes), the saving of fee (distribution fee) and the update of historical data are executed in step S206 and processing ends.

Moreover, When the upload (distribution) of the contents is not completed (step S205; No), it is determined whether the peer-to-peer communication is interrupted. When it is interrupted, auto-retry is executed in step S207, and it is judged whether the peer-to-peer communication is restored within a fixed time in step S208. Then, when it is restored (step S208; Yes), the upload (reception) of the contents and the update of the historical data are executed in step S204.

While, the peer-to-peer communication is restored (step S208; No), the terminal 3 reconnections to the distribution server 2 in step S209 and the progress state of the upload on the hard disc 30 and the current history are transmitted to the distribution server 2 from the terminal 3 in step S210. Then, matching to the history of the progress state of the distribution server 2 is executed in step S211. Additionally, matching processing is executed by the distribution server 2.

Namely, since the distribution server grasps the communication state of the terminal 3 by the aforementioned heartbeat communication, matching to the history of the progress state of the download of the distribution sever 2 is executed, thereby the size of the distributed contents is determined before interruption occurs. Then, in step S212, the saving of the distribution fee and the update of historical data are executed according to the size of the distributed contents, and processing is ended.

In this way, the contents are downloaded (received). Then, in this case, when the distribution of contents is interrupted, the saving of the distribution fee is executed according to the size of contents distributed so far, so that an excellent download (reception) can be executed even in an unstable network.

In addition, when the peer-to-peer communication is not restored in step S208 and reconnection to the distribution server 2 cannot be made in step S209, processing in steps S209 to S212 is executed when connection to the distribution server 2 is made.

Moreover, the distribution server 2 executes processing as illustrated in flowcharts of, for example, FIGS. 8 to 11.

Figure 8:
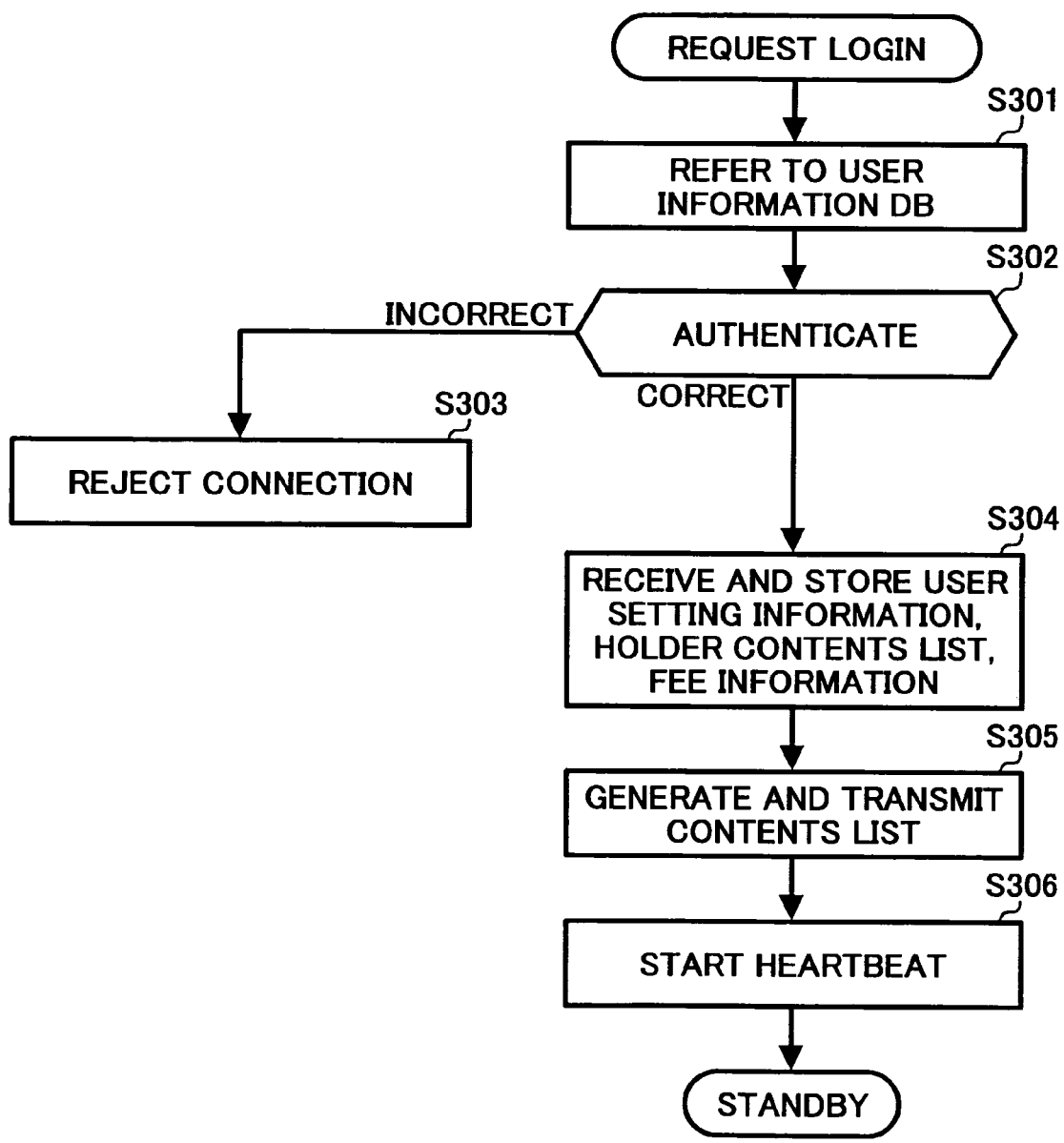
FIG. 8 is a flowchart explaining an operation when a contents server receives a login request.

First of all, FIG. 8 illustrates processing of the distribution sever 2 when a login request is sent from the user terminal 3. In FIG. 8, when there is a login request, the database of user information including an address of the terminal that received the distribution of the contents in step S301 is referenced, and it is judged whether the user should be authenticated in step S302. Then, when the user is not authenticated (incorrect), connection is rejected in step S303.

In contrast to this, when the user is authenticated (correct) in step S302, user setting information, a contents list selected by the user, and fee information are received and stored in step S304. Then, a contents list corresponding to these information items is generated and transmitted in step S305. Moreover, heartbeat communication is started, so that processing is changed to a standby mode.

Figure 9:
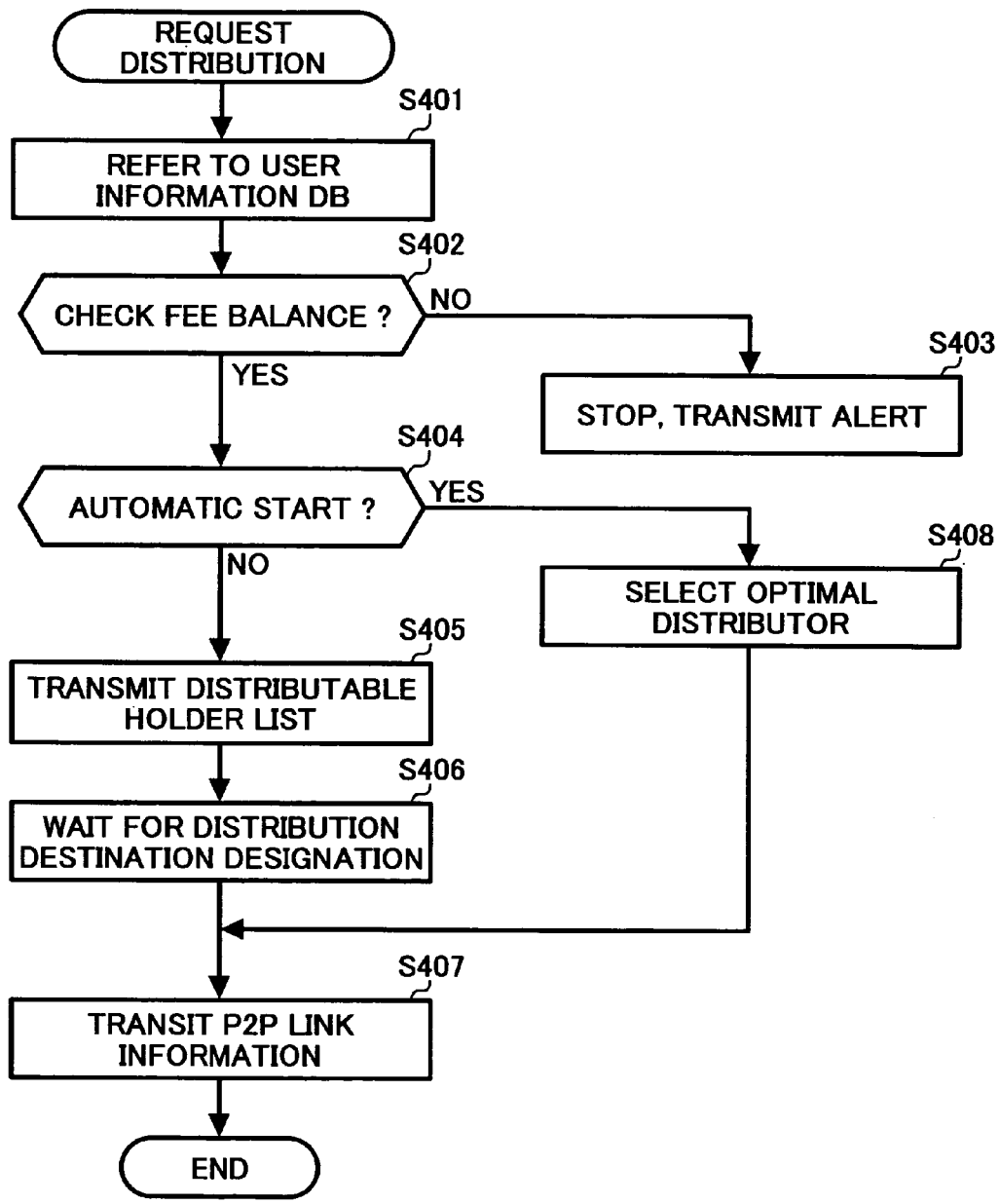
FIG. 9 is a flowchart explaining an operation when a user terminal sends a request for distributing contents to another apparatus.

FIG. 9 illustrates processing of the user terminal 3 when a distribution request is sent from other user terminal 3. In FIG. 9, when there is a distribution request, the database of user information is referenced in step S401, and it is checked whether the balance on the user's prepaid fee is sufficient in step S402. Then, when the balance is insufficient (step S402; No), processing is stopped an alert is transmitted to the user terminal 3 in step S403.

On the other hand, when the balance is sufficient (step S402; Yes), it is judged whether or not automatic start is selected in step S404. Then, when it is not selected (step S404; No), a distributable holder list (list table) is transmitted in step S405, designation of distribution destination is in a standby state in step S406, and information for performing a peer-to-peer communication to the designated distribution destination is transmitted in step S407.

When the automatic start is selected (step S404; Yes), an optimal distributor is selected in step S408 and the processing proceeds to step S407. In addition, since the distribution server 2 grasps the communication state of the terminal 3 by the aforementioned heartbeat communication, an optimal distributor having a similar communication environment can be selected. Then, when information is transmitted in step S407, processing in the distribution server 2 ends.

Figure 10:
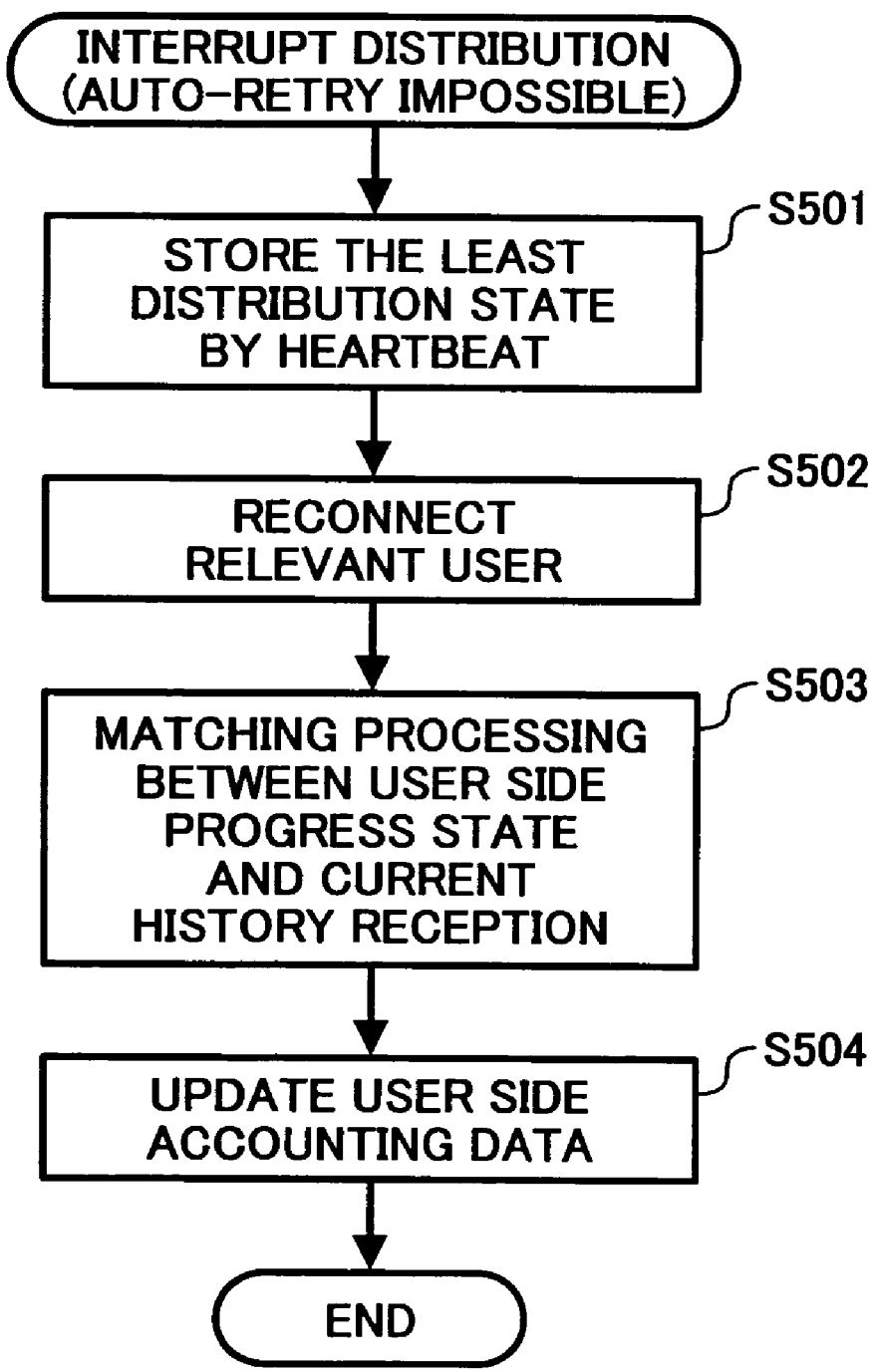
FIG. 10 is a flowchart explaining an operation of a terminal when the distribution of contents is interrupted.

FIG. 10 illustrates processing when distribution at the user terminal 3 is interrupted and a retry cannot be executed. In FIG. 10, when such circumstances occur where the distribution is interrupted and the retry cannot be executed, the latest distribution state is detected by the heartbeat communication in step S501. Then, reconnection to the relevant user terminal 3 is executed in step S502.

The progress state of the user terminal 3 and the history at this time are received and matched to the history of the progress state recorded on the distribution server 2. In other words, step S503 corresponds to processing in the aforementioned steps S121 and S211. Then, accounting data of the user terminal side is updated in step S94 is updated and processing is ended.

Figure 11:
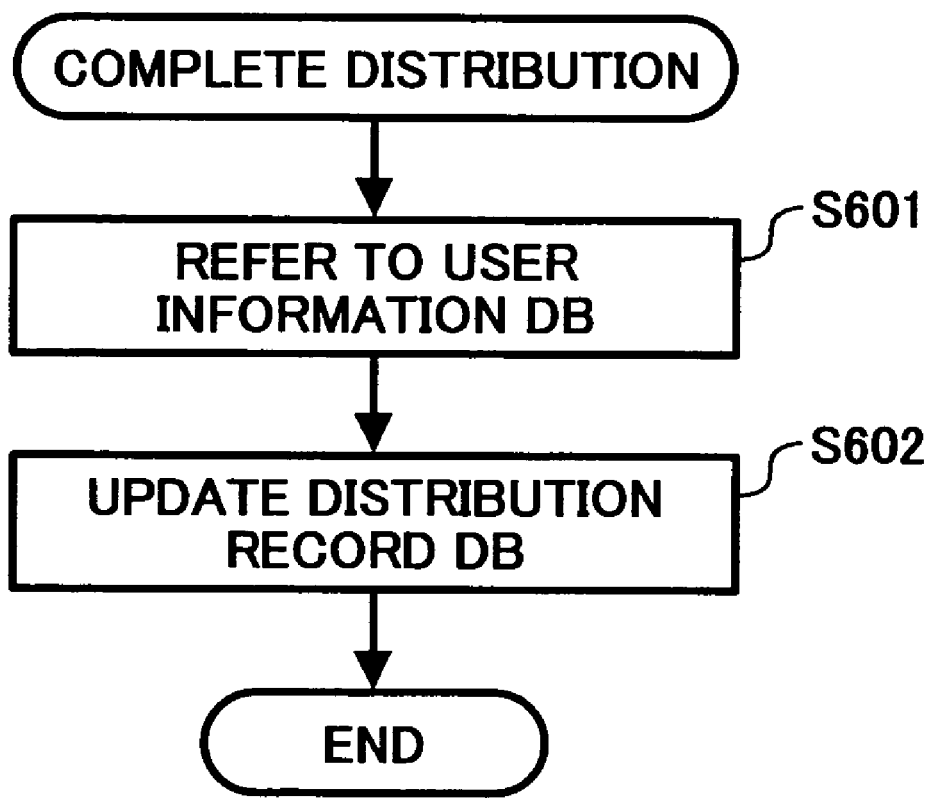
FIG. 11 is a flowchart explaining an operation of a terminal when the distribution of contents is completed.

FIG. 11 further illustrates processing when the distribution of the contents ends. Namely, in FIG. 11, when the distribution of the contents ends, the database of user information is updated in step S601, the database of distribution record is updated in step S602, and processing is ended.

FIG. 12A illustrates an example of accounting information stored in the user terminal 3. As illustrated in the figure, accounting information includes 1) an event ID fixed uniquely for each event, 2) time and date of event occurrence, 3) information on amount, balance, communication partner where the fee arises due to download, upload, over-the-counter sales and the like, and 4) reason why the fee arises due to replenishment of prepaid fee and purchase of the distribution contents by download, upload, over-the-counter sales and the like.

On the other hand, FIG. 12B illustrates an example of history. As illustrated in the figure, historical information includes 1) an event ID, 2) time and date of event occurrence, 3) an event ID of replenishment of prepaid fee and purchase of the distribution contents by download, upload, over-the-counter sales and the like, 4) ID of action partner user or store, 5) ID of distribution contents (item) ("-" means only fee replenishment with no contents in the figure), and 6) link ID in connection with accounting information when a fee arises by an event.

Accordingly, an address of the terminal 3 that received the distribution of the contents is stored in the distribution server 2, and a terminal stored in the contents sever is selected to execute distribution to other terminal based on information on the distribution state from the distribution server 2, thereby making it possible for the user to eliminate complicated procedures such as registration and the like and execute redistribution easily.

Moreover, according to the aforementioned embodiment, the storage section for prepaid amount is provided in the rewritable storage area using the storage media 6 having the rewritable storage area, thereby enabling to prepay accounting to be included in a sales price of storage medium and add prepaid amount easily by the store terminal 5, with the result that account collection can be easily executed.

Furthermore, at the time of displaying the list table of the contents distributable terminals, the list can be displayed together with arbitrary added value information from the distributable terminal. In other words, in the aforementioned embodiment, since the contents distribution is collectively managed by the distribution server 2, added information such as arbitrary comment and advertisement from the distributable terminal 3 and the presence or absence of possession of other contents can be added to the list table to display.

Moreover, in the reception or distribution of the contents, an amount of money to be subtracted or added can be arbitrarily fixed in the same manner. Namely, in the aforementioned embodiment, since the contents are collectively managed by the distribution server 2, the amount of money can be arbitrarily set. Moreover, the amount of money can be automatically fixed according to reliability of the distribution or reception of the contents or the time period of the distribution of the contents.

Moreover, in the aforementioned embodiment, there is provided a program for reproducing the contents distributed in the read-only storage area of the storage media 6 is provided to make it possible to reproduce the contents when it is used together with the storage medium. This enables to ensure the relationship with the storing section of the prepayment of money provided in the rewritable area of the storage medium to prevent the contents from illegally used to protect the copyright satisfactorily.

Furthermore, in the aforementioned embodiment, a digital watermark is added to the contents to be distributed, and only the contents to which the digital watermark is added are distributed. This enables to prevent the contents from illegally used to protect the copyright satisfactorily.

Second Embodiment

Figure 13:
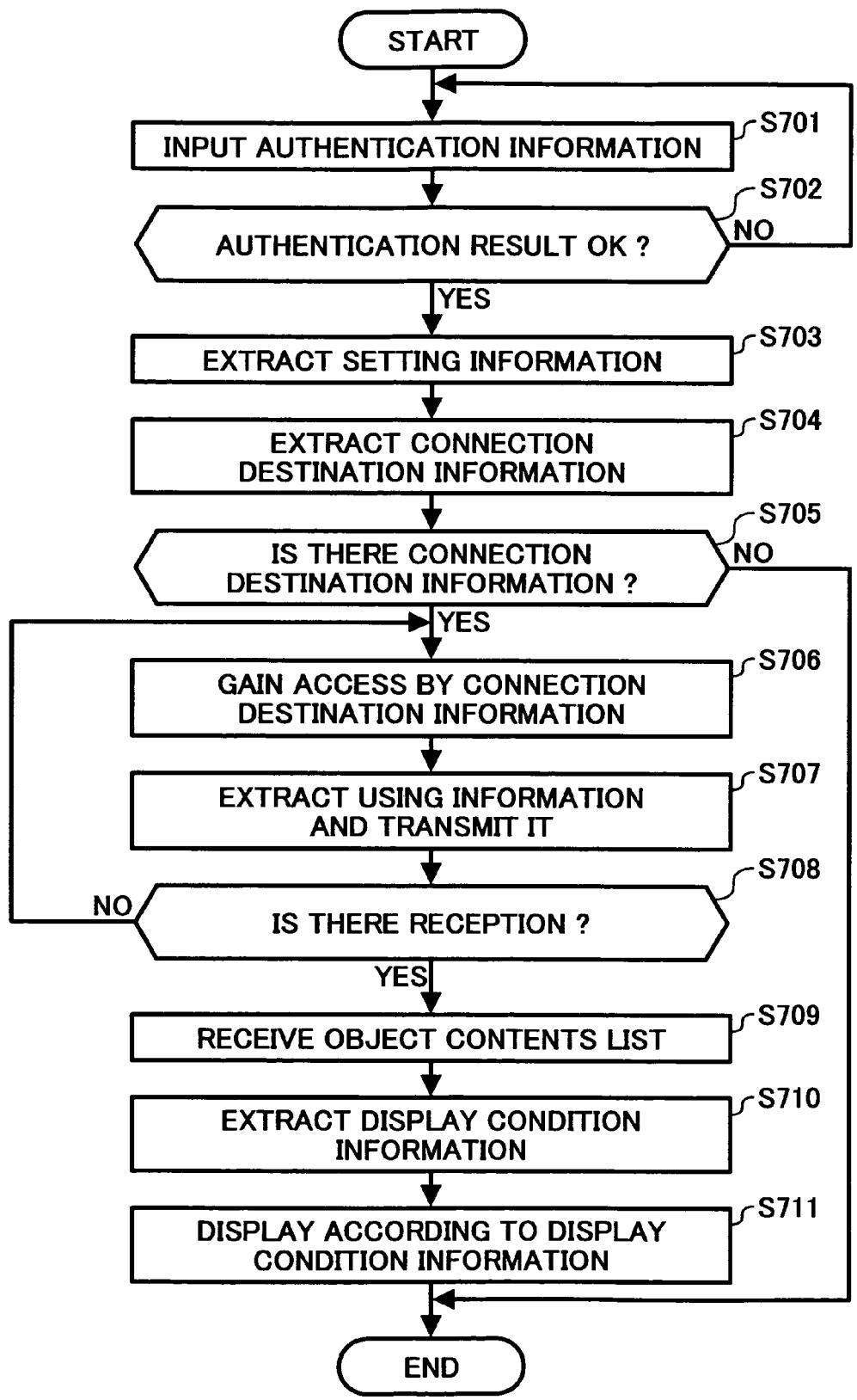
FIGS. 13 to 15 are flowcharts explaining an operation of a user terminal in a second embodiment.
Figure 14:
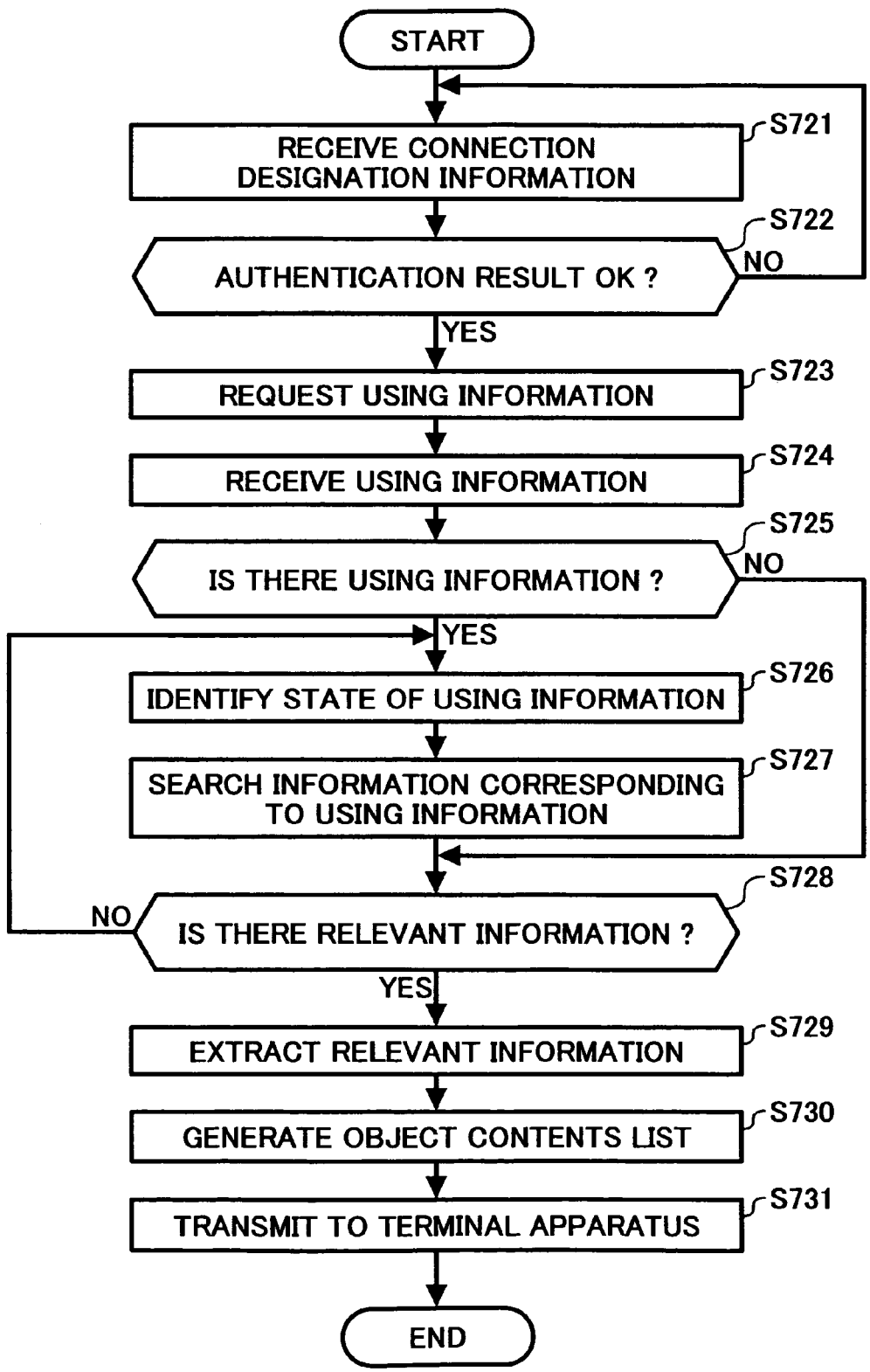
Figure 15:
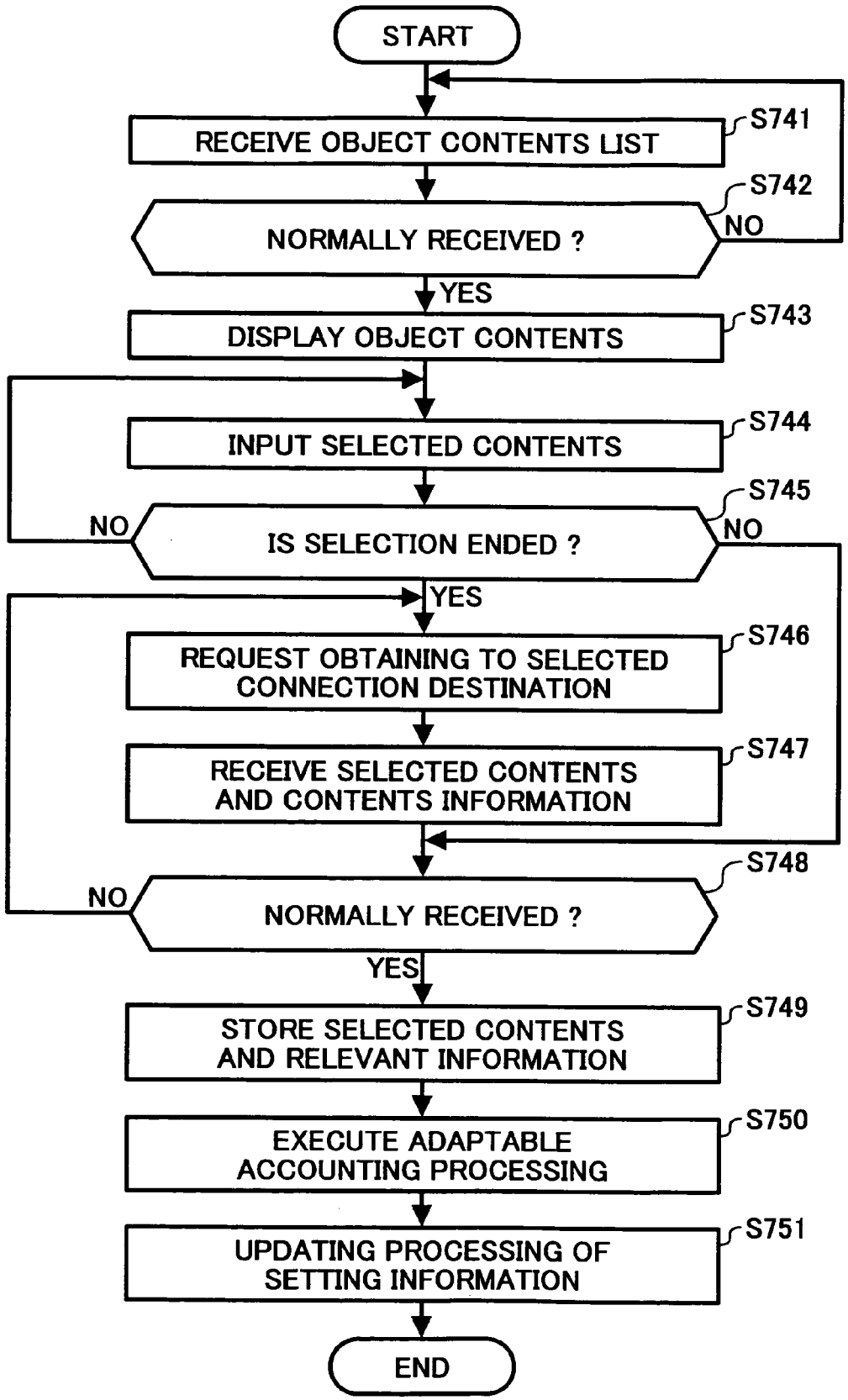

The following will explain an application of processing executed by the user terminal 3 with reference to FIGS. 13 to 15.

FIG. 13 is a flowchart illustrating display processing during the time from when the storage media 6 is attached until the terminal apparatus 3 displays an initial screen relating to contents distribution.

Processing illustrated in FIG. 13 is started after the storage media 6 is attached to the user terminal 3.

The user terminal 3 waits for the time when authentication information (user ID, access key, etc.) of the storage media 6 is input from the input section 340 (step S701). When authentication information is input, a consistency (match and mismatch) between the input authentication information and authentication information recorded on the storage media 6 is checked (step S702). When there is a match (step S702; Yes), an assurance of the original is OK, and when there is no match (step 702; No), the processing goes back to step S701 to wait for reentry.

Next, the terminal 3 reads setting information (connection destination information, user information, contents list, accounting information, etc.) recorded on the storage media 6 (step S703). The terminal 3 extracts connection destination information from among the read setting information (step S704).

The terminal 3 checks whether "connection destination information" is extracted in step S704 (step S705). When connection destination information is extracted (step S705; Yes), the processing proceeds to a next step, and when it is not extracted (step S705; No), the processing ends.

Moreover, when connection destination information is extracted, the terminal 3 gains access to the connection destination (contents server 2 or contents holder terminal 4) specified by the connection destination information to establish the connection (step S706).

Next, the terminal 3 obtains information on apparatus information of the terminal 3 itself (apparatus number, model, OS, hardware configuration, etc.) from OS, and transmits obtained apparatus information and setting information read in step S703 to the connection destination (step S707).

Sequentially, the terminal 3 waits for a response from the connection destination (contents server 2 or contents holder terminal 4) (step S708).

When the terminal 3 receives the response within a fixed period of time (step S708; Yes), the processing goes to a next step. When the terminal 3 receives no response (step S708; No), the processing goes back to the step S706 and the terminal 3 connects to the connection destination to perform processing for transmitting using information again. In addition, step S708 may be in a standby state for a fixed period of time.

Sequentially, the terminal 3 receives an object contents list from the connection destination (step S709).

Next, the terminal 3 reads display condition information recorded on the storage media 6 and/or stored in the user terminal 3 (step S710).

After that, the terminal 3 arranges (partially enhances and the like) the received object contents list according to display condition information and display it (step S711). Accordingly, display processing ends.

Moreover, FIG. 14 is a flowchart illustrating processing in which each user terminal 3 sends the object contents list to the other user terminal 3.

This processing is started when there is access to each user terminal 3 from the other user terminal. First of all, the user terminal 3 receives authentication information (user ID, access key, etc.) of the storage media 6 from the user terminal 3 as an access source (step S721). Next, the user terminal 3 gains access to the contents server 2 to check whether the received authentication information matches corresponding information stored in the contents server 2 (step S722). As a result, when user authentication is OK (step S722; Yes), the processing goes to a next step, and when the user is not authenticated (step S722; No), the processing ends.

Moreover, the user terminal 3 sends a request for transmission of user information to the user terminal 3 as a connection destination (step S723) and receives user information according to the request (step S724).

Next, the user terminal 3 determines whether balance information and using history information are included in the received using information (step S725). When balance information or using history information is included (step S725; Yes), the processing goes to a next step, and when neither balance information nor using history information is included (step S725; No), the processing jumps to step S728.

After that, the user terminal 3 identifies information (balance, access history, access area, link condition, holding contents information) included in the using information (step S726). Moreover, the user terminal 3 searches stored information (contents) corresponding to the respective identified user information (step S727).

Next, the user terminal 3 checks whether or not relevant information is detected (step S728). When the relevant information is detected (step S728; Yes), the processing goes to a next step. While, when no relevant information is detected (step S728; No), the processing returns to step S726 to identify the using information again, and corrects a condition for judging as "relevant" to search relevant information.

The terminal 3 reads the detected relevant information (contents) from the hard disc 30 and the like. Moreover, the terminal 3 adds the stored latest news, recommended contents and the like (step S729).

Next, contents information that specifies the extracted contents and an object contents list added to display information according to the contents information are generated (step S730). The generated object contents list is transmitted to the user terminal 3 that requested the connection (step S731). In this way, object contents list sending processing is executed at the terminal apparatus.

FIG. 15 is a flowchart illustrating processing for requesting and receiving the contents list executed by the terminal apparatus 3 and accounting processing.

As explained with reference to FIG. 13, the terminal apparatus 3 receives the object contents list from the apparatus as the connection destination (step S741). Next, it is checked whether the object contents list is correctly received (step S742). When it is correctly received (step S742; Yes), the processing goes to a next step, and when it is not correctly received (step S742; No), the terminal apparatus 3 requests transmission again.

The terminal apparatus 3 displays the received object contents list based on display information (step S743). As described above, each line of the contents list is enhanced and displayed based on display information. For example, contents with no balance of the prepayment, which can be downloaded, is enhanced and displayed with a message relating to the contents.

Sequentially, the terminal apparatus 3 receives a user's selection of contents described in the displayed object contents list (step S744).

Next, the terminal apparatus 3 checks whether the selection of contents ends (step S745). When the selection of contents ends (step S745; Yes), the processing goes to a next step, and when the selection of contents does not end (step S745; No), the terminal apparatus waits for a next selection of contents.

Next, the terminal apparatus 3 sends the connection destination a request for downloading the selected contents and relevant information to establish a peer-to-peer communication (step S746). The selected contents and relevant information are received (step S746). In addition, if a condition is provided to the receiving side or transmitting side, transmission and reception are performed according to the condition.

Moreover, when the terminal apparatus 3 checks the reception state (step S748) and when the reception is normally completed (step S748; Yes), the processing goes to a next step, and when the reception is not normally completed (step S748; No), the terminal apparatus 3 sends an obtaining request to the connection destination again.

The terminal 3 stores the received contents and relevant information to a predetermined storage area (step S749). In addition, the contents and relevant information are stored in the hard disc 30 and other information is stored in the storage media 6.

Moreover, accounting processing is executed according to the received contents and the reception state (step S750).

Furthermore, the terminal 3 writes updated information on the reception of contents to setting information and transmits the updated object list to the contents server 2 (step S751).

Third Embodiment

The following will explain the contents distribution system suitable for distributing live broadcasting contents.

Figure 16:
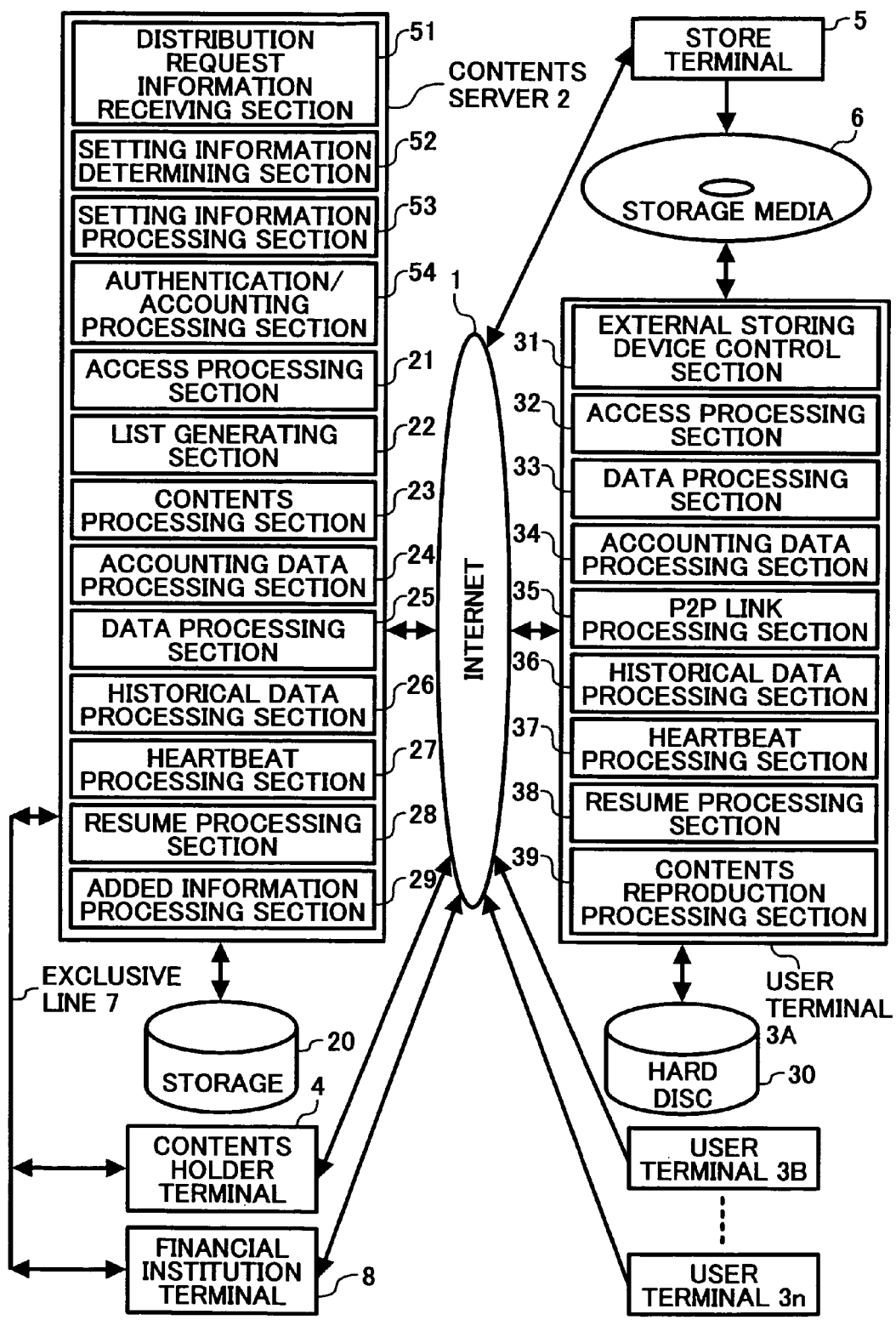
FIG. 16 is a block diagram of a contents distribution system of a third embodiment of the present invention.

Specifically, FIG. 16 illustrates one embodiment of the system used to distribute the live broadcasting.

In addition, in the configuration illustrated in FIG. 16, the same reference numerals as those of FIG. 1 are added to the same components illustrated in FIG. 1 and the explanation is omitted.

In FIG. 16, in addition to the components illustrated in FIG. 1, the contents server 2 includes a distribution request information receiving section 51, a setting information determining section 52, a setting information processing section 53, and an authentication/accounting processing section 54. In addition, some of these components can be shared by the components illustrated in FIG. 12.

Regarding the components other than the distribution center 2, the same components as illustrated in FIG. 1 are used.

In this system, the sponsor of the live broadcasting inputs opening information on opening of performances, lectures that are sources of live broadcasting contents to, for example, contents holder terminal 4. The opening information includes artist information (name of singer, name of band, name of lecturer, speaker name, venue information on event site (name of venue, seating capacity, the number of cameras, acoustic information, etc.), time and date (year, month, day) fixed for an event, distribution provider information (unnecessary when the user himself/herself performs distribution. The distribution provider may be selected based on input information), and the like.

This forms a live broadcasting contents registration table as illustrated in FIG. 17A, a venue information table as illustrated in FIG. 17B, a distribution information table as illustrated in FIG. 17C, and a sponsor information table as illustrated FIG. 17D in the contents holder terminal 4.

Then, the contents holder terminal 4 sets a predetermined remaining day left before a live broadcasting distribution (90 days before, 30 days before, 7 days before, one day before) based on the time and date fixed for an event input by the sponsor. The contents holder terminal 4 obtains a degree of demand in the relevant remaining day left before the opening from information such as the number of spectators in the performances of the relevant artist held in the past, contents download contents, sales records such as compact disc, etc., the number of hits using a searching tool based on the artist information included in the input opening information.

In addition, the degree of demand is a value classified by a predetermined rank based on multiplications of "past performance state", "contents download (DL) state", and "searching result" and this is calculated on the basis of various information input by the sponsor.

The contents holder terminal 4 obtains a degree of distribution relating to strength of the distribution of the server and the link based on venue information and distribution provider information. The degree of distribution is a value classified by a predetermined rank based on various multiplications of "performance", "link", "speed", and this may be input by the sponsor or registered in advance. Then, an initial distribution cost as a reference is decided based on the degree of demand and degree of distribution.

Moreover, the initial distribution cost is decided. Sequentially, an application screen to be displayed on the user terminal 3 is formed based on the initial distribution cost as illustrated in FIG. 18.

Namely, in FIG. 18, at the top portion of the screen, a name of artist who performs a live performance is displayed. Then, at the upper stage of the screen, an input field of user information including an ID, a user name, a user E-mail address is provided. At the middle stage, a display field of purchase information is provided to display a venue where a live broadcasting is performed and information of accounting with different amount of money according to timing of the distribution.

In the display field of purchase information at the middle stage of the screen, regarding the distribution order where the number of applications is expected to exceed the distribution ability, for example, the use of a lottery system is displayed and a current competitive ratio is also displayed. Regarding the distribution order where the number of application is less than the distribution ability, no use of a lottery system is displayed, and it is also displayed that the reception is ended when the number of applications exceeds the distribution ability. However, when a terminal having a high ability of redistribution is selected as an upper user terminal 3, the following distributable number may be added.

At the lower stage of the screen, a selection field of a desirable purchase ticket is formed. In the selection field, for example, choices of each of a distribution time, a venue, and a camera are displayed. Then, each choice is selected according to the instruction from the user by the cursor controlling and clicking using a mouse.

At the further lower stage of the screen, there is formed a check field to indicate whether redistribution is allowed and whether automatic reconnection is performed. In addition, when the redistribution is allowed, there is a possibility of a refund and the amount of money is decided by the number of redistributions. The automatic reconnection means that reconnection is automatically made when the recovery from disconnection due to communication trouble is achieved.

Then, at the lowest portion of the screen, there is formed an application button to decide whether an application is sent according to the above setting. When the application button is operated, the aforementioned setting matters are sent and the application is executed.

In this way, accounting is differentiated according to the distribution order, making it possible to widen the range of the user's selection and to response to various requests from many users. In addition, when the number of applications exceeds the distribution ability and the lottery is conducted, it is possible to display to ask the user, who draws a losing number in the lottery, about a selection whether an application is filed in the other order.

Moreover, the lottery may be purely performed at random. However, it is possible to provide such a limit that a high priority is placed to a terminal where many distributions are conventionally to the relevant artist or a terminal to which a distribution is newly applied currently. Accordingly, for example, the terminal having a high redistribution ability is used as an upper terminal to reduce the entire distribution passage time, thereby making it possible to improve efficiency in the distribution.

Furthermore, the application screen as illustrated in FIG. 19 can be considered. The application screen of FIG. 19 is useful when a so-called down auction is executed in connection with the accounting of distribution. In FIG. 19, at the top portion of the screen, a name of artist who performs a live performance is displayed. Then, at the upper stage of the screen, an input field of user information including an ID, a user name, a user E-mail address is provided.

At the middle stage, a display field of purchase information is provided to display a venue where a live broadcasting is performed and accounting amount of money that is reduced sequentially according to timing (delay) of the distribution. Each accounting amount has a range (range is set). Moreover, each current application amount of money is displayed. Moreover, an application state and a sold-out state, which is shown when the number of applications reaches a maximum value of the distributable number, are displayed.

At the lower stage of the screen, a selection field of a desirable purchase ticket is formed. In the selection field, for example, choices of each of a distribution time, a venue, and a camera are displayed. Moreover, "a purchase ticket price varies" and "since tickets are sometimes sold out just before application, the contents of ticket should be confirmed by mail sent after application" are displayed as a warning.

At the further lower stage of the screen, there is formed a check field to indicate whether redistribution is allowed and whether automatic reconnection is executed. Then, at the lowest portion of the screen, there is formed an application button to decide whether an application is sent according to the above setting. When the application button is operated, the aforementioned setting matters are sent and the application is executed.

Here, an item whether there is a designation in a shooting style of an image to be distributed in the form of a live broadcasting is added. A viewer selects a camera at the time of applying the distribution.

Here, when an "entirety" is designated as a camera selection, a general image edited by the sponsor is provided. In contrast to this, when a "random", a "vocal" and a "drum" are designated, an image including mainly a specific location and member is provided unlike the image edited by the sponsor.

The contents server 2 receives distribution request information from one who desires a live broadcasting distribution (hereinafter referred to as distribution desiring person) and registers it to a distribution desiring person database. Then, the contents server 2 identifies the presence or absence of a designation relating to the edition of the live broadcasting distribution. In the case of the "presence", the contents server 2 executes categorize processing in a designated condition. This processing may be statistical processing in which a designated key word is identified and the identified key word is used, or processing may be executed such categorizing is executed according to the majority of key words.

Moreover specifically, an information table of edit pattern illustrated in FIG. 20A and an information table of distribution desiring persons illustrated in FIG. 20B are registered in the contents server 2, and an information table of the pattern is formed according to the number of distribution desiring persons as illustrated in FIG. 20C. Then, shooting condition corresponding to the number of upper key words with a fixed range or a fixed value or more is decided as another shooting pattern of the image (pattern A) shot by the sponsor is decided therefrom.

Thereafter, the distribution center 2 calculates a ratio of distribution desiring persons under a shooting condition as a distributor radiation (pattern A) with the "absence" of designation. Then, the distribution center 2 changes the setting condition relating to the initial live broadcasting distribution according to distribution information (processing specification of the distribution server, added specification of the link and the like) relating to distribution control registered in the distribution information database different from the registered venue information based on each calculated ratio. Then, the distribution center 2 executes distribution based on the changed setting condition.

In other words, categorizing as illustrated in FIG. 21B is executed to the distribution desiring persons 1 to n as illustrated in FIG. 21A. Here, it is assumed that the total number of distribution desiring persons is 100. Among them, it is assumed that the number of distribution desiring persons with no designation is 45 and the number of distribution desiring persons with the designation is 55 having a breakdown where the number of persons, who desires member A, is 30, the number of persons, who desires member B, is 20 and the number of persons, who desires the other, is 5. At this time, distribution control is executed in a ratio where the number of persons, including 5 persons, who desire the other, are added to 45 person, who desire distribution with no designation, is 50 (50%), the number of persons, who desires member A, is 30 (30%), and the number of persons, who desires member B, is 20 (20%).

Accordingly, for example, when all (100%) of the distribution desiring persons desires the image (pattern A) shot by the sponsor, 100% of distribution ability is controlled as the distribution of the relevant image. However, when the pattern B (idea 1) is 30% of those slated to distribute and the pattern C (idea 2) is 20% of those slated to distribute, distribution control is executed according to each ratio, efficient distribution can be executed according to the user's needs.

In addition, according to the application screen shown in FIG. 21, regarding the contents for which the small number of persons applies, eagerness to purchase can be increased by reducing the price, thereby enabling to improve an increase in users. Regarding the contents for which the large number of persons applies, the price is reduced by a so-called auction, thereby enabling to obtain much income.

In the words, execution of such the auction is effectively realized when the distribution of the so-called live broadcasting contents is possible, and the present invention can satisfactorily realize the environment of such the live broadcasting contents.

Accordingly, the sponsor, who executes the distribution of the live broadcasting contents, can change the distribution price decided as the reference according to the degree of demand at the point of the predetermined remaining day left before the set live broadcasting distribution (90 days before, 30 days before, 7 days before, one day before). In other words, as illustrated in FIG. 22, for example, when the degree of demand is high and the distribution ability is low, 200 yen, which is set as a reference price when the reception of application is started, is increased to 300 yen, and when the degree of demand is low and the distribution ability is high, 200 yen is decreased to 100 yen.

Furthermore, when the degree of demand is high and the distribution ability is low, the number of redistributors is increased after opening the event to reduce redistributing time. On the other hand, when the degree of demand is low and the distribution ability is high, the number of redistributors is decreased after opening the event to increase redistributing time. Additionally, when no change occurs in both the degree of demand the degree of distribution by the remaining day left before opening the event, the distribution price calculated as the reference till the live broadcasting distribution. Moreover, no change occurs in the number of the redistributors and the redistribution time interval after opening the event.

Regarding the conventional ticket sale for the performance, it is general that an advance ticket price is lower than a ticket sold on the day of the performance. However, in the aforementioned system, as illustrated in FIG. 22, the price is changed before opening the event to limit the number of distribution desiring persons before opening the event or increase the number of the redistributors after distributing the live broadcasting and to decrease the redistribution time interval, thereby enabling to control the opportunity for the distribution after distributing the live broadcasting to be increased.

Accordingly, the event sponsor can calculate the number of distributors (primary, secondary, . . . ), a live broadcasting distribution price (primary, secondary, . . . ), and a redistribution condition (redistribution interval) and the like to execute an efficient distribution according to the market demands.

Next, the live broadcasting contents distribution method will be explained with reference to FIGS. 23 to 25.

First of all, an operation of the contents server 2 will be explained with reference to FIG. 23.

The contents server 2 receives primary participants (persons who desire to receive the live broadcasting of the event) (step S801). Next, the contents server 2 judges whether the number of participants reaches a predetermined number (step S802). Then, when the number of participants reaches the predetermined number, the contents server 2 executes accounting processing to charge those persons for a fixed amount (step S803). Sequentially, the contents server 2 judges whether a predetermined time has passed (step S804). When the predetermined time has passed, the contents server 2 judges the presence or absence of the application contents (step S805).

Regarding the participants who are judged that a change occurred, distribution setting is changed (step S806).

Next, the reception of secondary participants is executed (step S807). A distribution destination is specified (step S808) to execute account processing to the secondary participants (step S809). Moreover, distribution processing is executed (step S810) to judge whether processing ends (step S810). Then, when processing ends (step S811; Yes), the processing ends, and when it does not end (step S811; No), the control returns to step S804.

Figure 24:
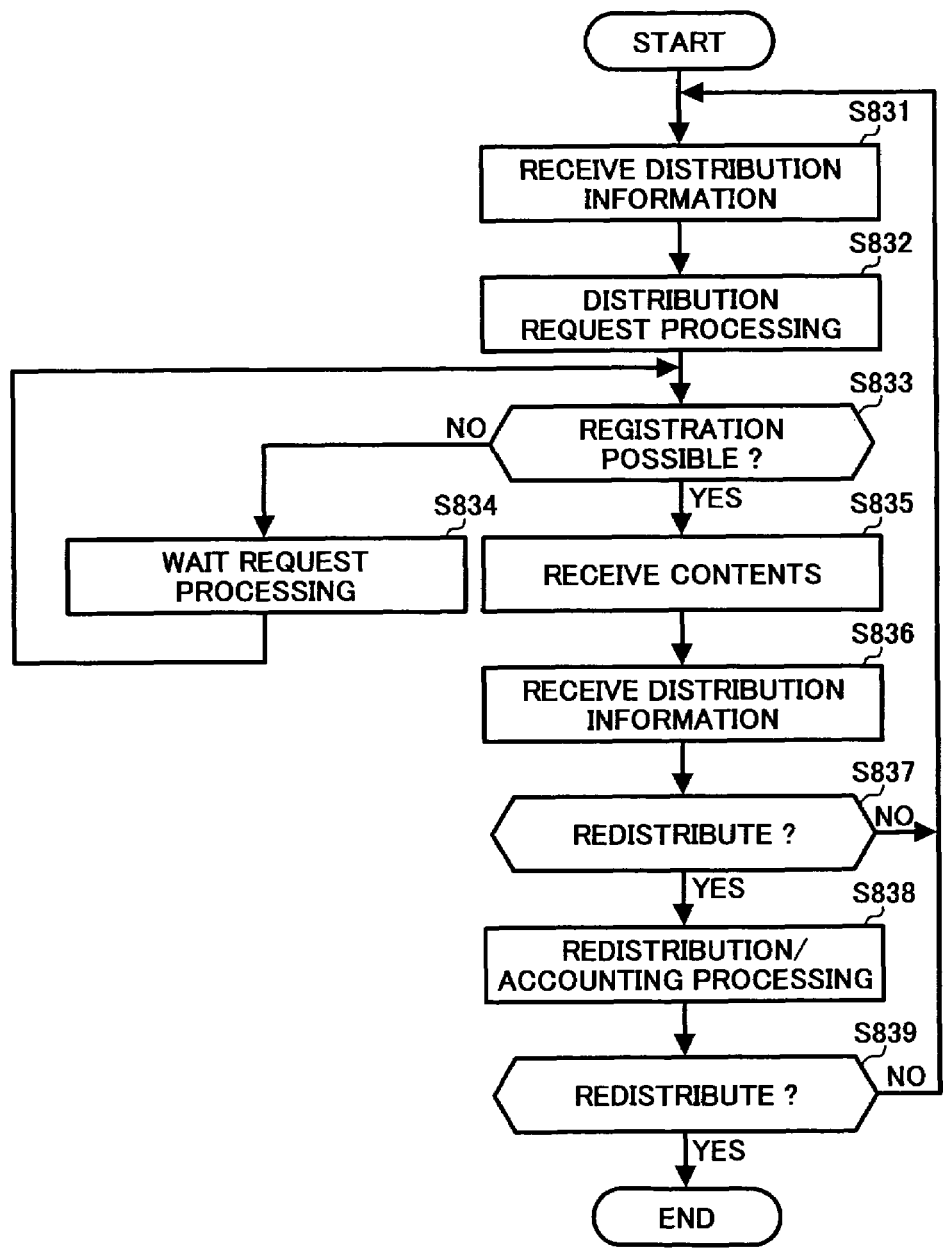

FIG. 24 illustrates an operation of the user terminal 3.

As illustrated in FIG. 24, when the user terminal 3 starts processing, the user terminal 3 receives distribution information (step S831) to execute distribution request processing (step S832). Moreover, the user terminal 3 judges whether registration is allowed (step S833). When the registration is allowed (step S833; No), the user terminal 3 executes wait request processing (step S834). The user terminal 3 receives the contents (step S835) to execute account processing (step S836).

Moreover, the user terminal 3 judges whether redistribution should be executed (step S837). When the redistribution is not executed (step S837; No), control is returned to step S831. On the other hand, when the redistribution is executed (step S837; Yes), the user terminal 3 executes account processing due to the redistribution (step S838). Moreover, the user terminal 3 judges whether the processing ends (step S839). Then, when processing ends (step S839; Yes), the processing ends, and when it does not end (step S839; No), the processing is retuned to step S831.

Figure 25:
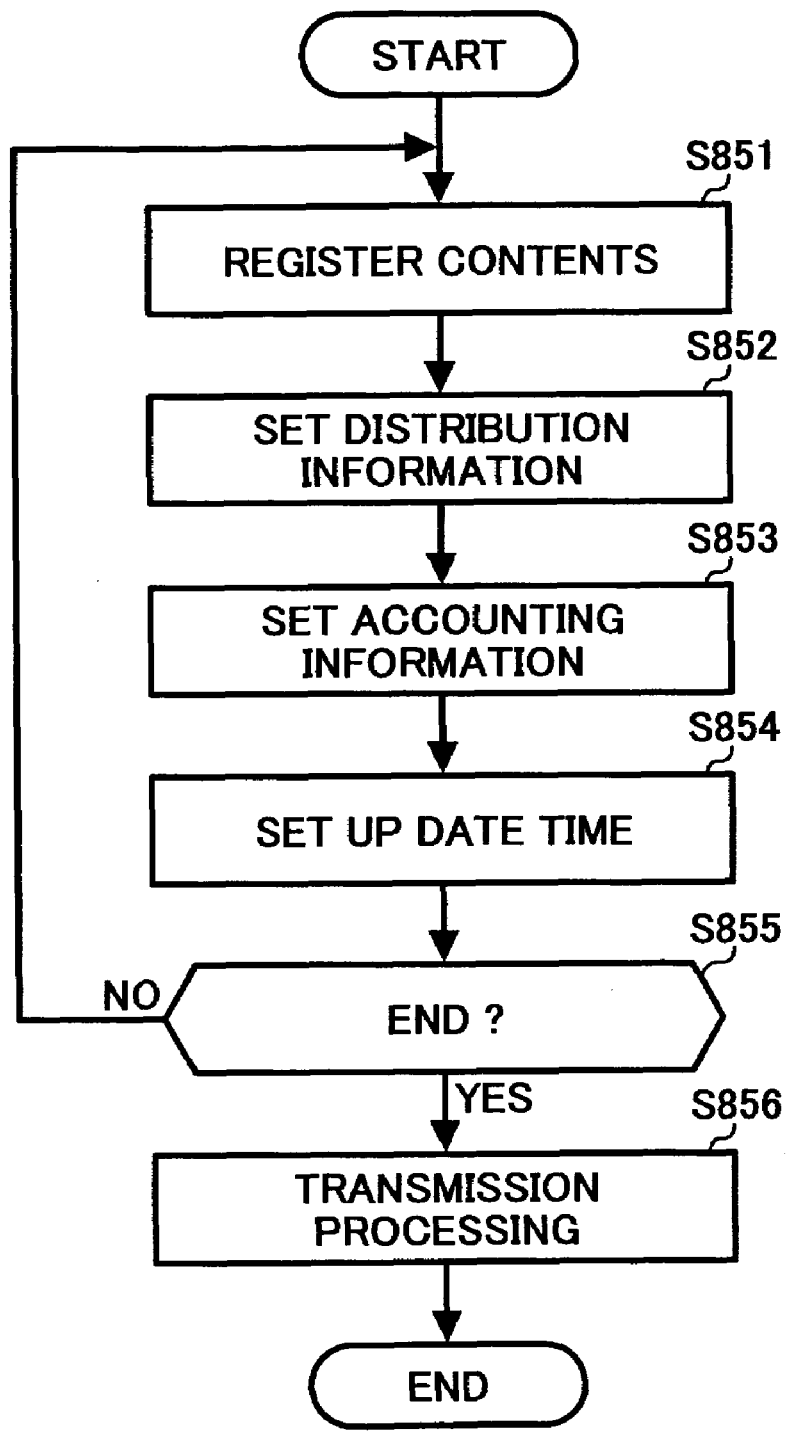

FIG. 25 illustrates an operation of the contents holder terminal 4.

As illustrated in FIG. 25, when the contents holder terminal 4 starts processing, the contents holder terminal 4 registers contents (step S851). Next, the contents holder terminal 4 sets distribution information, accounting information, update time sequentially in steps S852 to S854. Moreover, the contents holder terminal 4 judges whether registration setting ends (step S855). Then, when processing ends (step S855; Yes), the processing ends (step S856), and when it does not end (step S839; No), the processing is retuned to step S851.

Figure 23:
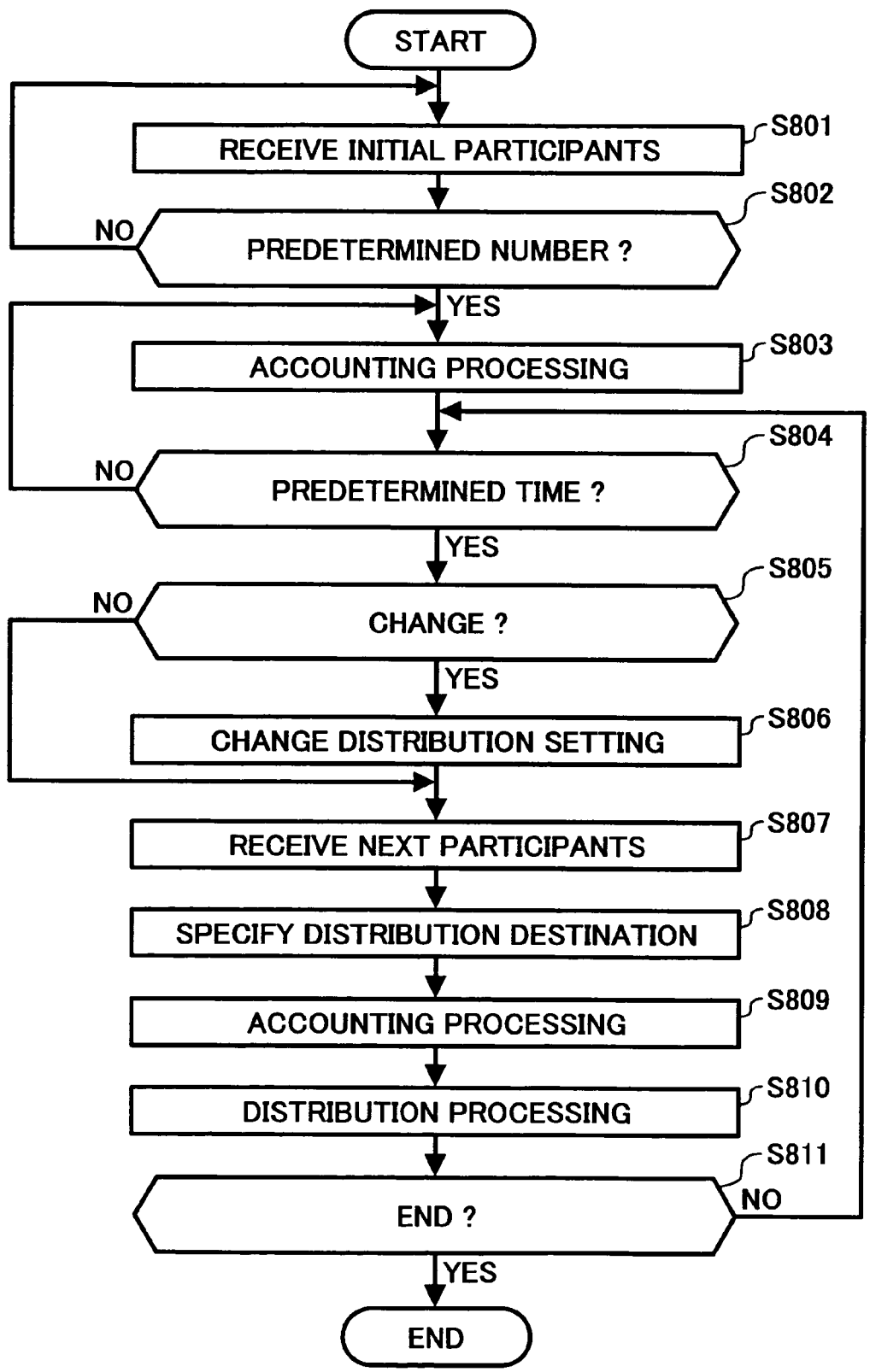
FIGS. 23 to 25 are flowcharts each explaining a method for distributing contents of a live broadcasting.
Figure 26:
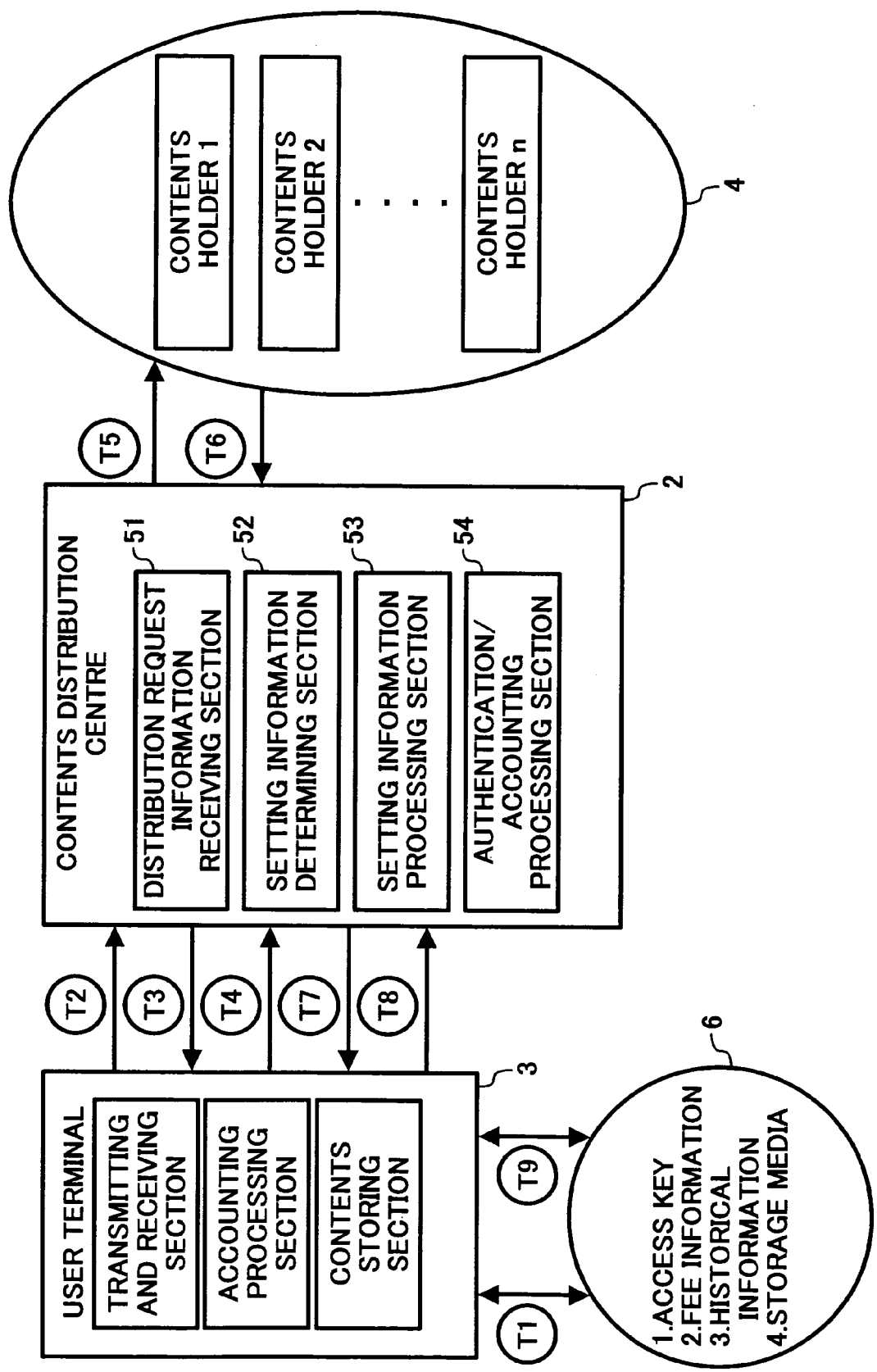
FIG. 26 is a view explaining the flow among a contents server, a user terminal, and a contents holder terminal in order to explain steps for distributing live broadcasting contents.

The mutual operation among the contents server 2, the user terminal 3 and the contents holder terminal 4, which are included in the flowcharts shown in FIGS. 23 to 25, is illustrated as in FIG. 26.

First of all, the storage media 6 is set to the user terminal 3 (step T1). The user terminal 3 executes authentication processing for checking whether the set storage media is a normal media and whether the user is a normal user. In addition, authentication using the password may be possible in order to check whether the user is a normal user. When it is judged that the storage media is no normal media and the user is no normal user, the software recorded on the storage media 6 cannot be started and a predetermined error message is displayed and the processing is ended.

On the other hand, when it is judged that the storage media is the normal media and the user is the normal user, the user terminal 3 moves to the general login operation to read the access key recorded on the storage media 6, and transmits it to the contents server 2. The contents server 2 receives the access key and judges whether the user terminal should be authenticated to access. When it is allowed, the contents server 2 sends information indicating authentication OK to the user terminal 3.

After obtaining authentication of access, the user terminal 3 transmits its own contents list to the contents server 2 (step T2). The contents server 2 transmits the list of the distributable live broadcasting contents to the user terminal 3. The user terminal 3 receives the list and displays it (step T3). Moreover, the contents server 2 and the user terminal 3 start the heartbeat communication therebetween to periodically transmit and receive a CUP using rate and a link speed.

In addition, the contents, which can be distributed from one user terminal 3 to the other user terminal 3, is limited to those obtained on the service of the present invention, and the originality of the contents are assured by the technique such as a digital watermark. This enables to prevent the fear of distributing the illegal duplication and to protect the right of the contents holder.

Furthermore, regarding the contents of the live broadcasting contents list, which are displayed by the contents server 2, the contents, which can be downloaded using the balance, or the contents of the genre, which the user likes, can be displayed on a priority basis in a way that is distinguishable from the other contents based on the access key of the storage media 6, accounting information, and download information. In addition, as accounting information and download information, those that are recorded on the database at the contents server 2 can be used.

Moreover, performer's comments, creator's comments, a bulletin board between the users, a level of satisfaction are displayed (or hyperlinked), and a promotion image spot and a preview are added to the live broadcasting contents list to be displayed as additional information. The user can review them before downloading the contents themselves.

Furthermore, the contents holder pays an advertising fee separately to obtain a preferential list display and a banner advertising and the distribution provider informs the user of "best hit information" by mail to make it possible to advertise. By placing such advertisement, it is possible to establish the business.

The user terminal 3 displays the live broadcasting contents list include these information items. When the user designates (selects) an arbitrary contents from the displayed contents list, the user terminal 3 sends a request for distributing the contents to the contents server 2 (step T4).

When receiving distribution request information from the user terminal 3, the contents server 2 gains access to the contents database of the contents holder terminal 4 to search distribution request information set by the holder of the selected contents, and reads distribution request information (steps T5, T6). Sequentially, the contents server 2 distributes the live broadcasting contents based on the condition and setting adhered to the read distribution request information (step T7).

Moreover, in a case where the secondary and afterward distributions of the live broadcasting contents are executed (the user terminal, which downloaded the contents from the contents server 2, distributes the contents), a distribution is executed as "redistribution possible" from the user terminal 3 in which a desirable distribution is registered on the screen of FIG. 18 or FIG. 19 based on the setting information of the contents holder. The history of the secondary and afterward distributions are sent to the contents server 2 from each user terminal 3 (step T8), and the historical information is registered in the database of the contents server 2. Moreover, accounting processing is executed according to the state of the registered distribution (step T9).

Figure 27:
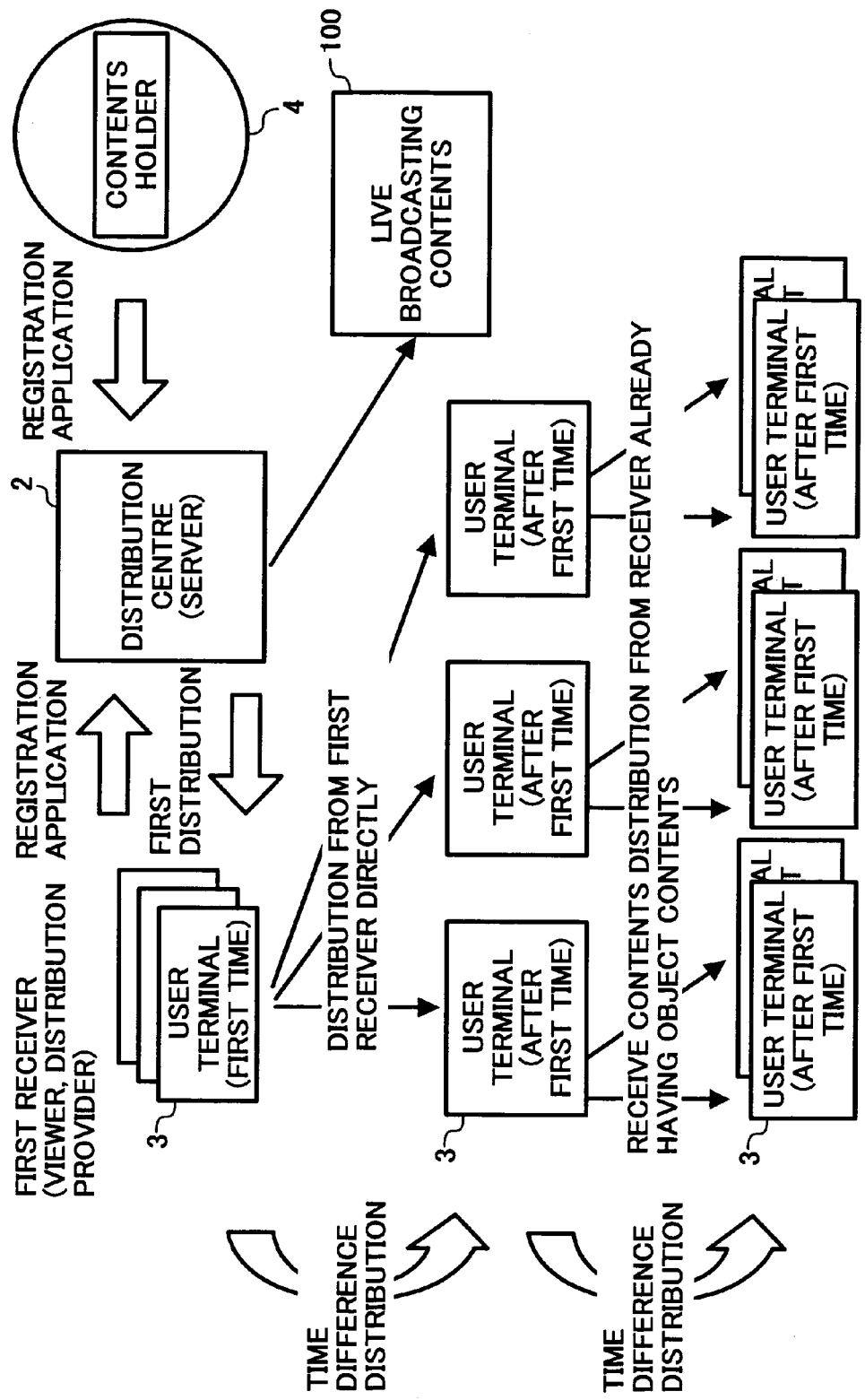
FIG. 27 is a view explaining a state in which live broadcasting contents are sequentially distributed.

As a result, the distribution of the live broadcasting contents is executed as illustrated in, for example, FIG. 27.

First of all, the contents holder terminal 4 sends an application for requesting transmission of contents to the contents server 2 (step Q1). Sequentially, the user terminal 3 applies for registration of reception (step Q2). Then, the live broadcasting contents 100 are directly distributed to the user terminals 3 of the predetermined number of primary participants (without being delayed) (step Q3). Sequentially, the contents are distributed to the user terminals 3 of the secondary and afterward participants from the user terminals 3 that received the primary distribution (with a predetermined time delay) (step Q4). After that, the contents are distributed to the user terminals 3 of the thirdly and afterward participants from the user terminals 3 of the secondary participants (with a predetermined time delay) (step Q5).

Therefore, according to this contents distribution system, the provider can distribute the contents to numerous distribution desiring persons by providing only the distribution facilities to the user terminals 3 of the predetermined number of primary participants.

Additionally, in each user terminal 3, the received contents are stored to the hard disc 30 and the like. This makes it possible for the viewers to view the contents later on if the user terminal 3 operates without standing by in front of the user terminals 3 at the distributing time. Moreover, since the distribution and reproduction are executed using the storage media 6, it is possible to completely protect the copyright of the stored contents.

Various embodiments and changes may be made thereunto without departing from the broad spirit and scope of the invention. The above-described embodiments are intended to illustrate the present invention, not to limit the scope of the present invention. The scope of the present invention is shown by the attached claims rather than the embodiments. Various modifications made within the meaning of an equivalent of the claims of the invention and within the claims are to be regarded to be in the scope of the present invention.

This application is based on Japanese Patent Application No. 2002-365685 filed on Dec. 17, 2002, Japanese Patent Application No. 2002-372803 filed on Dec. 24, 2002, Japanese Patent Application No. 2002-372804 filed on Dec. 24, 2002, Japanese Patent Application No. 2003-96497 filed on Mar. 31, 2003, Japanese Patent Application No. 2003-96498 filed on Mar. 31, 2003, and Japanese Patent Application No. 2003-96499 filed on Mar. 31, 2003, and including specification, claims, drawings and summary. The disclosure of the above Japanese Patent Applications is incorporated herein by reference in its entirety.

What is claimed is:

1. A contents distribution support system comprising a contents server,
a plurality of terminals connected to the contents server via a network to allow contents to be distributed to the terminal from the contents server and further allow the contents to be distributed to another terminal from the terminal that received the distribution, and
an amount setting section that fixes an amount to be subtracted or added,
wherein the contents server comprises a storing section that stores information on the terminal that received the distribution of the contents and information on a distribution state to be associated with each other, a receiving section that receives a terminal that receives a request for distributing the contents in advance at the time of executing a synchronous distribution of the contents, a counting section that counts a plurality of patterns in connection with the synchronously distributed contents included in the received distribution request, a deciding section that decides a scale of the distribution including at least primary or secondary and other distribution ranges and distribution frequencies of the contents according to the result of the counting section, and a section that selects a terminal stored in said storing section based on information concerning the distribution state from said contents server, and enables the selected terminal to distribute the contents to another terminal,
wherein a storage media having at least one of a read-only storage area and a rewritable storage area is used, a program for gaining access to the contents server via the network to the read-only storage area, a storing section of a prepaid amount is provided in the rewritable storage area and an arbitrary amount is subtracted or added from/to the prepaid amount according to the distribution or reception of the contents, and the subtracted or added amount is stored in the storing section of the prepaid amount, and
wherein the contents server includes a communication monitoring section that monitors a communication state between the selected one terminal and another terminal, and when interruption of the communication is judged by the communication monitoring section, selection is executed again based on information on the terminal stored in the storing section, and the amount setting section fixes the amount to be added by dividing the amount according to a contents size before the communication is interrupted and a contents size after the communication is interrupted.

2. The contents distribution support system according to claim 1, wherein the storing section grasps identification information on the terminal that received the distribution of the contents and information on a communication state of the terminal to store these information, and distribution to another terminal is executed in such a manner that a terminal similar to the communication state is selected.

3. The contents distribution support system according to claim 1, wherein the contents server includes a communication monitoring section that monitors the communication state between the selected one terminal and another terminal, and when interruption of the communication is judged by the communication monitoring section, selection is executed again based on information on the terminal stored in the storing section.

4. The contents distribution support system according to claim 1, wherein the amount fixed by the amount setting section is set according to a frequency of the distribution or reception of the contents or a distribution time period of the contents.

5. The contents distribution support system according to claim 1, wherein the read-only storage area stores a program for allowing the distributed contents to be reproduced.

6. The contents distribution support system according to claim 1, wherein the contents server includes a section that obtains information indicating the distribution state executed by each terminal.

7. The contents distribution support system according to claim 6, further comprising an accounting storing section that subtracts or adds an arbitrary amount from/to a prepaid amount according to the distribution or reception of the contents, and stores the subtracted or added amount.

8. The contents distribution support system according to claim 7, further comprising an amount setting section that arbitrarily fixes the amount to be subtracted or added, and the amount fixed by the amount setting section is set according to the distribution state obtained by an obtaining section.

9. The contents distribution support system according to claim 1, wherein the contents server includes a storing section that stores information on the terminal that received the distribution of the contents from the contents server, a first selecting section that selects a primary terminal based on information stored in the storing section and a first reference at the time of executing a synchronous distribution of the contents, and a second selecting section that selects secondary and other terminals sequentially based on information stored in the contents server in connection with the selected primary terminal.

10. The contents distribution support system according to claim 9, wherein the terminal includes a display section, and a screen that receives a desire for a rank of the contents distribution of the primary terminal and/or secondary and other terminals and accounting information to be subtracted or added are displayed on the display section.

11. The contents distribution support system according to claim 1, wherein the contents distributed from one terminal that received an initial synchronous distribution of the contents can be transmitted to further another terminal according to the passage of a fixed time, and the number of primary terminals selected based on the stored information and a first reference is decided according to an edit pattern.

12. The contents distribution support system according to claim 11, wherein the secondary and other terminals are sequentially selected according to the edit pattern in connection with the selected primary terminal.

13. The contents distribution support system according to claim 12, wherein selection of the terminal is executed from the terminals that applied for the distribution of the contents in advance based on the information stored in the contents server, and at the time of application in advance, at least a desire for a rank of the contents distribution of the primary terminal and/or secondary and other terminals is received, and the condition of the distribution is made different according to the rank of the contents distribution of the primary terminal and secondary and other terminals.

14. The contents distribution support system according to claim 13, wherein the terminal includes a display section and the display section includes a section that receives a desire for a rank of the contents distribution of the primary terminal and/or secondary and other terminals.

15. The contents distribution support system according to claim 13, wherein the terminal uses a storage media having a read-only storage area and a rewritable storage area and subtracts or adds amount information corresponding to amount information stored in a storage area of a prepaid amount that is formed in the rewritable storage area according to the distribution or reception of the contents, and stores the subtracted or added amount information to the storage area of the prepaid amount according to an application program for gaining access to the contents server stored in the read-only storage area via the network.

16. The contents distribution support system according to claim 15, wherein the terminal includes a display section, and a screen that receives a desire for a rank of the contents distribution of the primary terminal and/or secondary and other terminals and accounting information to be subtracted or added are displayed on the display section.

17. The contents distribution support system according to claim 1, wherein any one of the terminals with information stored in the storing section is selected to distribute the stored contents to another terminal.

18. A terminal apparatus that is a computer apparatus that downloads predetermined contents from an apparatus of a connection destination for use in a contents distribution support system, said contents distribution support system including:

a contents server;

a plurality of terminals connected to the contents server via a network to allow contents to be distributed to the terminal from the contents server and further allow the contents to be distributed to another terminal from the terminal that received the distribution; and an amount setting section that fixes an amount to be subtracted or added, and said terminal apparatus comprising:

a connecting section that connects to a predetermined connection destination via communication;

a transmitting section that transmits user information on the computer user and information that specifies the contents stored in the terminal; and a display section that displays an object contents list received according to the transmission based on set display information, wherein apparatus information transmitted by the transmitting section is measuring information on performance of the apparatus that transmits and receives or reproduces the contents or the transmission and reception state, wherein the contents server comprises a storing section that stores information on the terminal that received the distribution of the contents and information on a distribution state to be associated with each other, a receiving section that receives a terminal that receives a request for distributing the contents in advance at the time of executing a synchronous distribution of the contents, a counting section that counts a plurality of patterns in connection with the synchronously distributed contents included in the received distribution request, and a deciding section that decides a scale of the distribution including at least primary or secondary and other distribution ranges and distribution frequencies of the contents according to the result of the counting section, and a section that selects a terminal stored in said storing section based on information concerning the distribution state from said contents sewer, and enables the selected terminal to distribute the contents to another terminal, wherein a storage media having at least one of a read-only storage area and a rewritable storage area is used, a program for gaining access to the contents server via the network to the read-only storage area, a storing section of a prep aid amount is provided in the rewritable storage area and an arbitrary amount is subtracted or added from/to the prepaid amount according to the distribution or reception of the contents, and the subtracted or added amount is stored in the storing section of the prepaid amount, and wherein the contents server includes a communication monitoring section that monitors a communication state between the selected one terminal and another terminal, and when interruption of the communication is judged by the communication monitoring section, selection is executed again based on information on the terminal stored in the storing section, and the amount setting section fixes the amount to be added by dividing the amount according to a contents size before the communication is interrupted and a contents size after the communication is interrupted, and wherein the contents server includes a storing section that stores information on the terminal that received the distribution of the contents.

19. A terminal apparatus that is a computer apparatus that downloads predetermined contents from an apparatus of a connection destination for use in a contents distribution support system, said contents distribution support system including:
- a contents server;
- a plurality of terminals connected to the contents server via a network to allow contents to be distributed to the terminal from the contents server and further allow the contents to be distributed to another terminal from the terminal that received the distribution; and
- an amount setting section that fixes an amount to be subtracted or added, and said terminal apparatus comprising:
- a connecting section that connects to a predetermined connection destination via communication;
- a transmitting section that transmits user information on the computer user and information that specifies the contents stored in the terminal; and
- a display section that displays an object contents list received according to the transmission based on set display information, wherein user information transmitted by the transmitting section farther includes user idea information or limitation information on the download of the contents, wherein the contents server comprises a storing section that stores information on the terminal that received the distribution of the contents and information on a distribution state to be associated with each other, a receiving section that receives a terminal that receives a request for distributing the contents in advance at the time of executing a synchronous distribution of the contents, a counting section that counts a plurality of patterns in connection with the synchronously distributed contents included in the received distribution request, and a deciding section that decides a scale of the distribution including at least primary or secondary and other distribution ranges and distribution frequencies of the contents according to the result of the counting section, and a section that selects a terminal stored in said storing section based on information concerning the distribution state from said contents server, and enables the selected terminal to distribute the contents to another terminal, wherein a storage media having at least one of a read-only storage area and a rewritable storage area is used, a program for gaining access to the contents server via the network to the read-only storage area, a storing section of a prepaid amount is provided in the rewritable storage area and an arbitrary amount is subtracted or added from/to the prepaid amount according to the distribution or reception of the contents, and the subtracted or added amount is stored in the storing section of the prepaid amount, and wherein the contents server includes a communication monitoring section that monitors a communication state between the selected one terminal and another terminal, and when interruption of the communication is judged by the communication monitoring section, selection is executed again based on information on the terminal stored in the storing section, and the amount setting section fixes the amount to be added by dividing the amount according to a contents size before the communication is interrupted and a contents size after the communication is interrupted.

20. A contents distribution support method that executes a method of synchronous distribution from a contents server via a network to further allow the contents to be distributed to another terminal from one terminal that received an initial synchronous distribution of the contents according to the passage of a fixed time period, the method comprising the steps of:
- storing information on the terminal that received the initial synchronous distribution of the contents and information on a distribution state to be associated with each other;
- selecting a primary terminal based on the stored information and an arbitrary reference at the time of executing the synchronous distribution of the contents; and
- selecting secondary and afterward terminals based on information stored in a storing section in connection with the selected primary terminal, wherein the contents distribution support system further comprises a plurality of terminals connected to the contents server via the network to allow contents to be distributed and an amount setting section that fixes an amount to be subtracted or added, wherein the content server comprises a storing section that stores information on the one terminal that received the distribution of the contents and information on the distribution state to be associated with each other, a receiving section that receives a terminal that receives a request for distributing the contents in advance at the time of executing a synchronous distribution of the contents, a counting section that counts a plurality of patterns in connection with the synchronously distributed contents included in the received distribution request, and a deciding section that decides a scale of the distribution including at least primary or secondary and other distribution ranges and distribution frequencies of the contents according to the result of the counting section, and a section that selects a terminal stored in said storing section based on information concerning the distribution state from said contents server, and enables the selected terminal to distribute the contents to another terminal, wherein a storage media having at least one of a read-only storage area and a rewritable storage area is used, a program for gaining access to the contents server via the network to the read-only storage area, a storing section of a prepaid amount is provided in the rewritable storage area and an arbitrary amount is subtracted or added from/to the prepaid amount according to the distribution or reception of the contents, and the subtracted or added amount is stored in the storing section of the prepaid amount, and wherein the contents server further includes a communication monitoring section that monitors a communication state between the selected one terminal and another terminal, and when interruption of the communication is judged by the communication monitoring section, selection is executed again based on information on the terminal stored in the storing section, and the amount setting section fixes the amount to be added by dividing the amount according to a contents size before the communication is interrupted and a contents size after the communication is interrupted.

21. A computer-readable storage medium for storing a contents distribution support program that executes a method of synchronous distribution from a contents server via a network to further allow the contents to be distributed to another terminal from one terminal that received an initial synchronous distribution of the contents according to the passage of a fixed time period, the method comprising the steps of:

storing information on the terminal that received the initial synchronous distribution of the contents and information on a distribution state to be associated with each other;

selecting a primary terminal based on the stored information and an arbitrary reference at the time of executing the synchronous distribution of the contents; and selecting secondary and afterward terminals based on information stored in a storing section in connection with the selected primary terminal, wherein the contents distribution support system further comprises a plurality of terminals connected to the contents server via the network to allow contents to be distributed and an amount setting section that fixes an amount to be subtracted or added, wherein the content server comprises a storing section that stores information on the one terminal that received the distribution of the contents and information on the distribution state to be associated with each other, a receiving section that receives a terminal that receives a request for distributing the contents in advance at the time of executing a synchronous distribution of the contents, a counting section that counts a plurality of patterns in connection with the synchronously distributed contents included in the received distribution request, and a deciding section that decides a scale of the distribution including at least primary or secondary and other distribution ranges and distribution frequencies of the contents according to the result of the counting section, and a section that selects a terminal stored in said storing section based on information concerning the distribution state from said contents server, and enables the selected terminal to distribute the contents to another terminal, wherein a storage media having at least one of a read-only storage area and a rewritable storage area is used, a program for gaining access to the contents server via the network to the read-only storage area, a storing section of a prep aid amount is provided in the rewritable storage area and an arbitrary amount is subtracted or added from/to the prepaid amount according to the distribution or reception of the contents, and the subtracted or added amount is stored in the storing section of the prepaid amount, and wherein the contents server further includes a communication monitoring section that monitors a communication state between the selected one terminal and another terminal, and when interruption of the communication is judged by the communication monitoring section, selection is executed again based on information on the terminal stored in the storing section, and the amount setting section fixes the amount to be added by dividing the amount according to a contents size before the communication is interrupted and a contents size after the communication is interrupted.

* * * * *